June 11, 1963 P. R. PRICE ETAL 3,093,729
APPARATUS FOR ACTING IN TURN ON SHEETS IN A PILE THEREOF
Filed Jan. 28, 1958 27 Sheets-Sheet 1
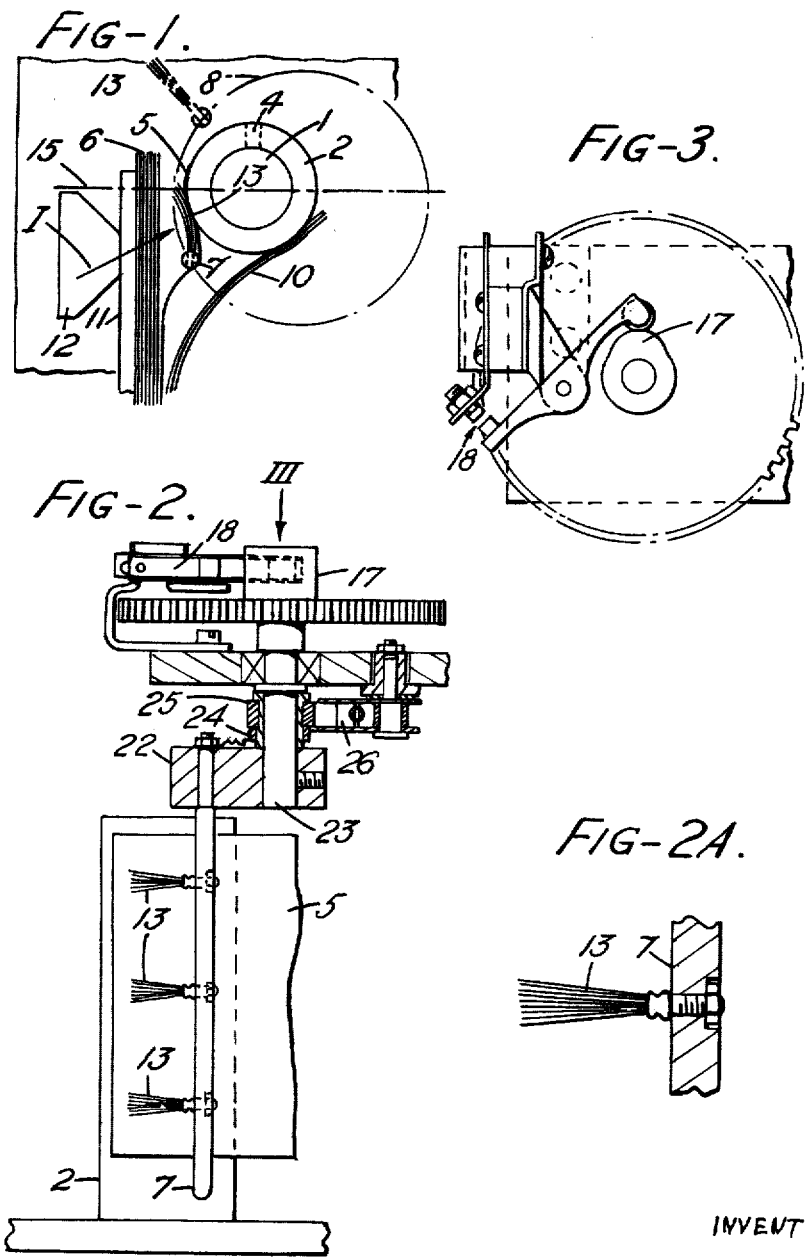
INVENTOR.
P. R. PRICE ET AL
BY Mawhinney & Mawhinney

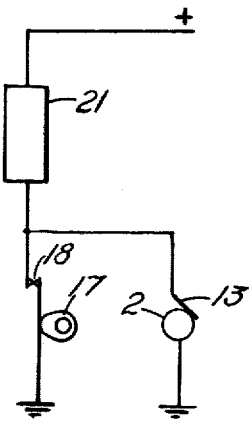
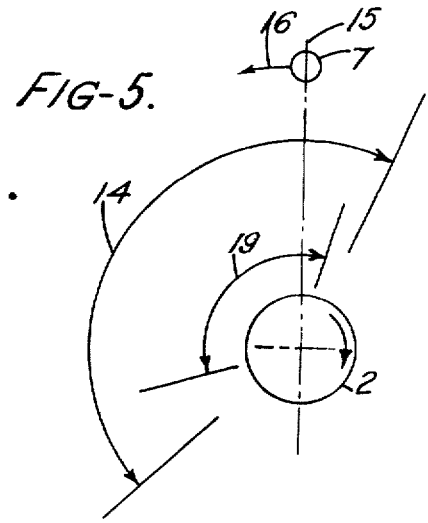

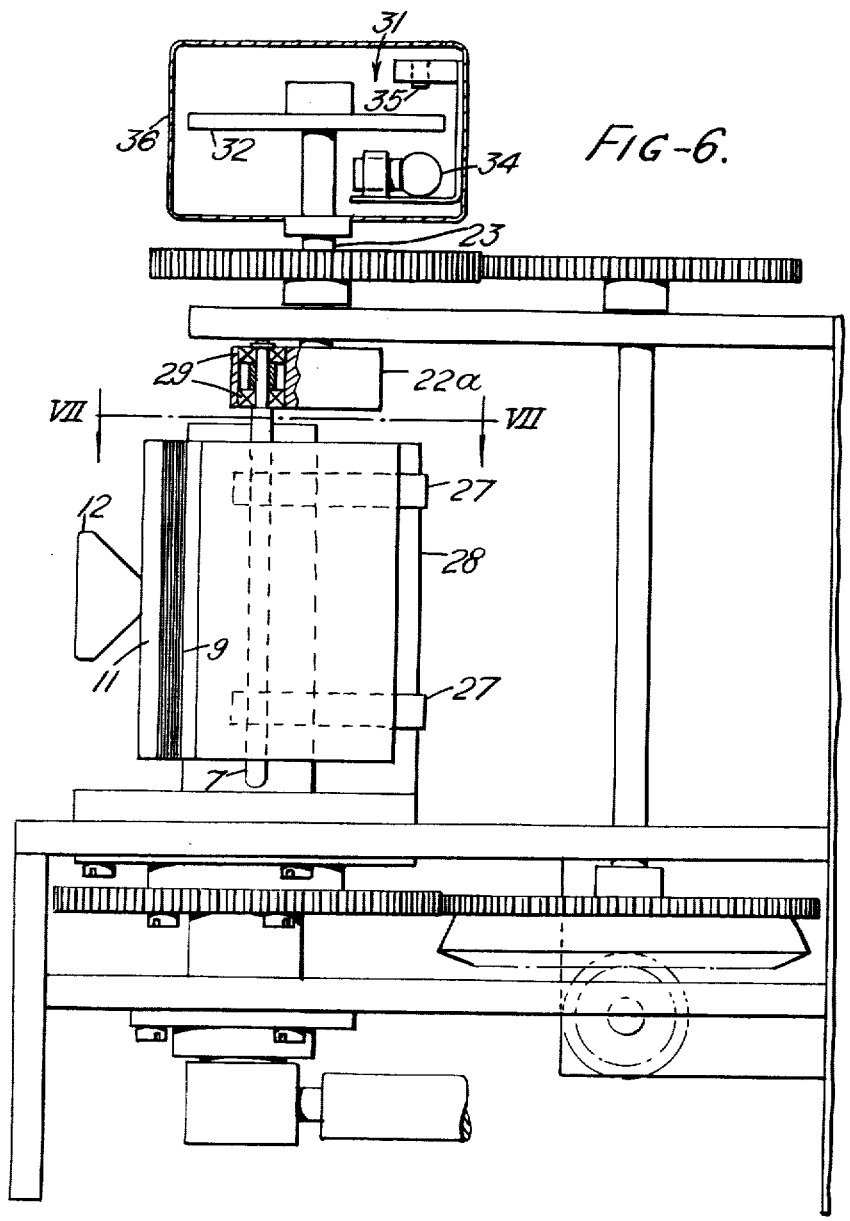

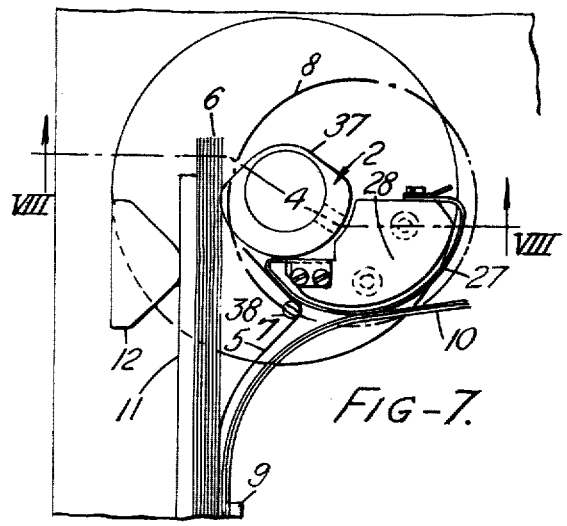
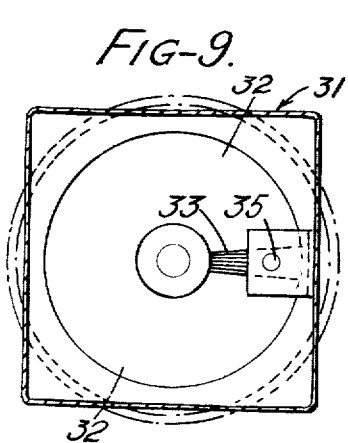
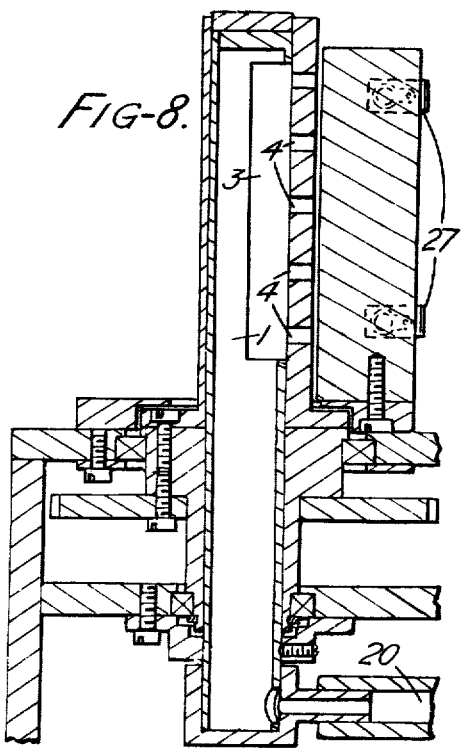

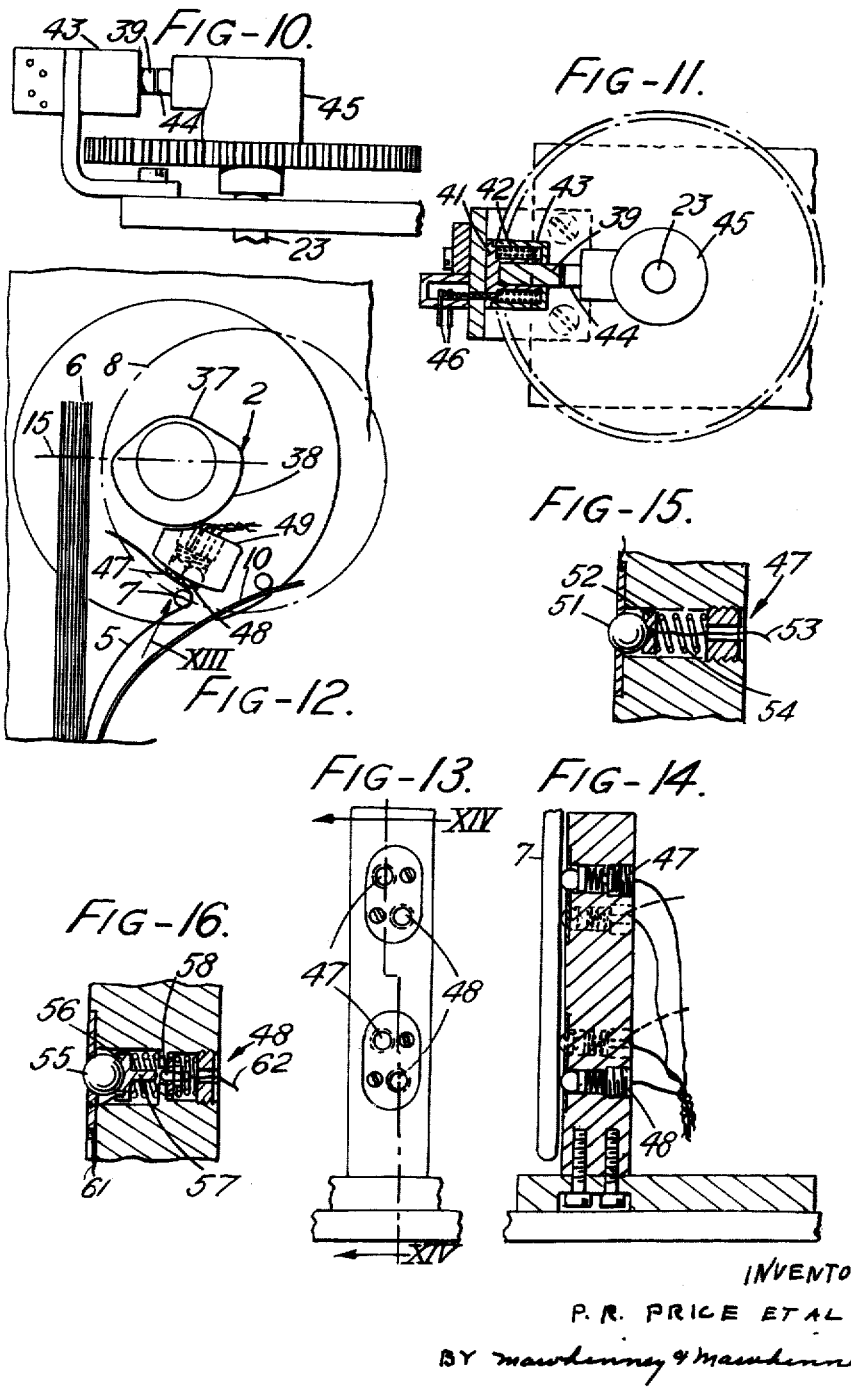

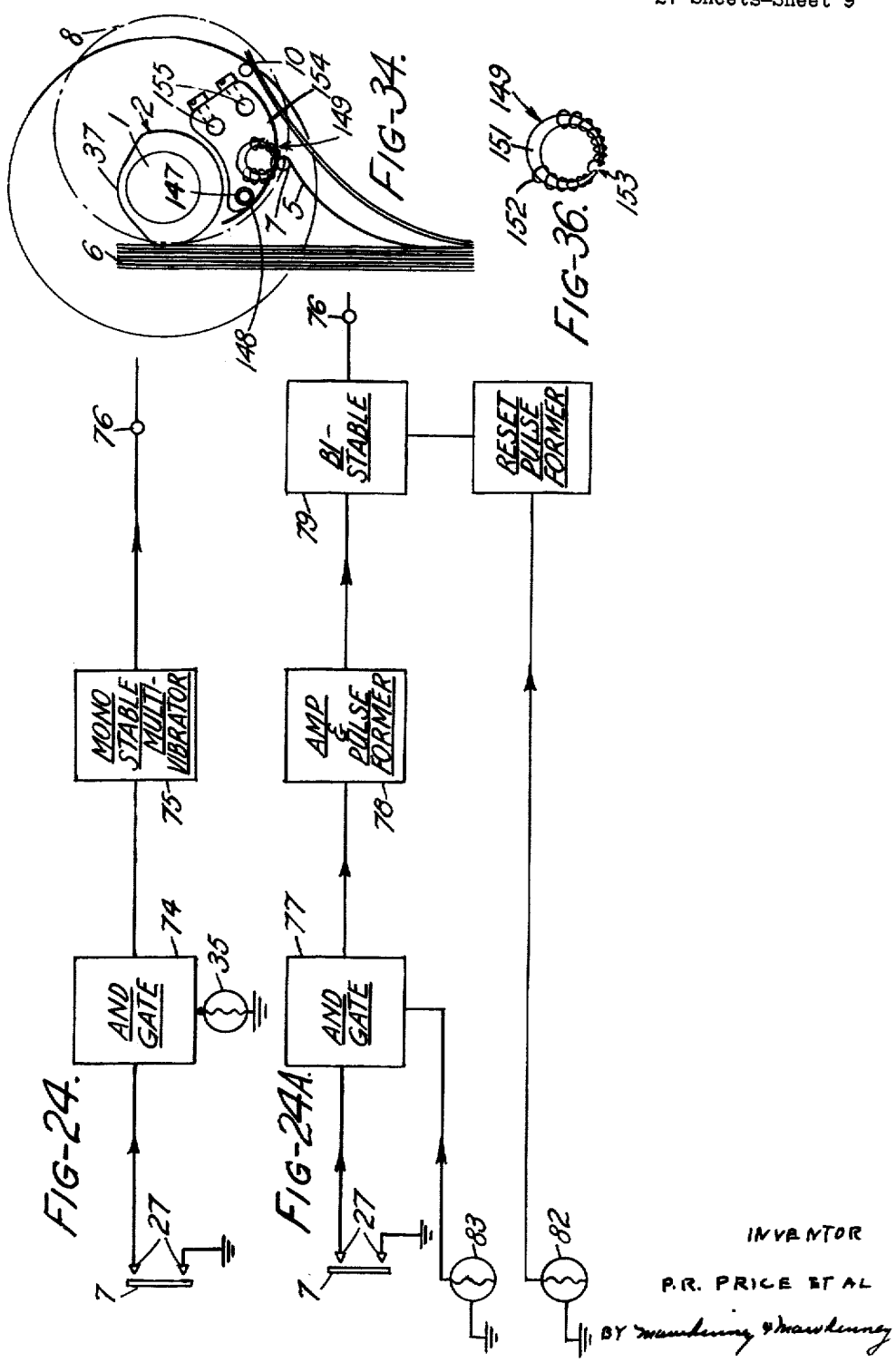

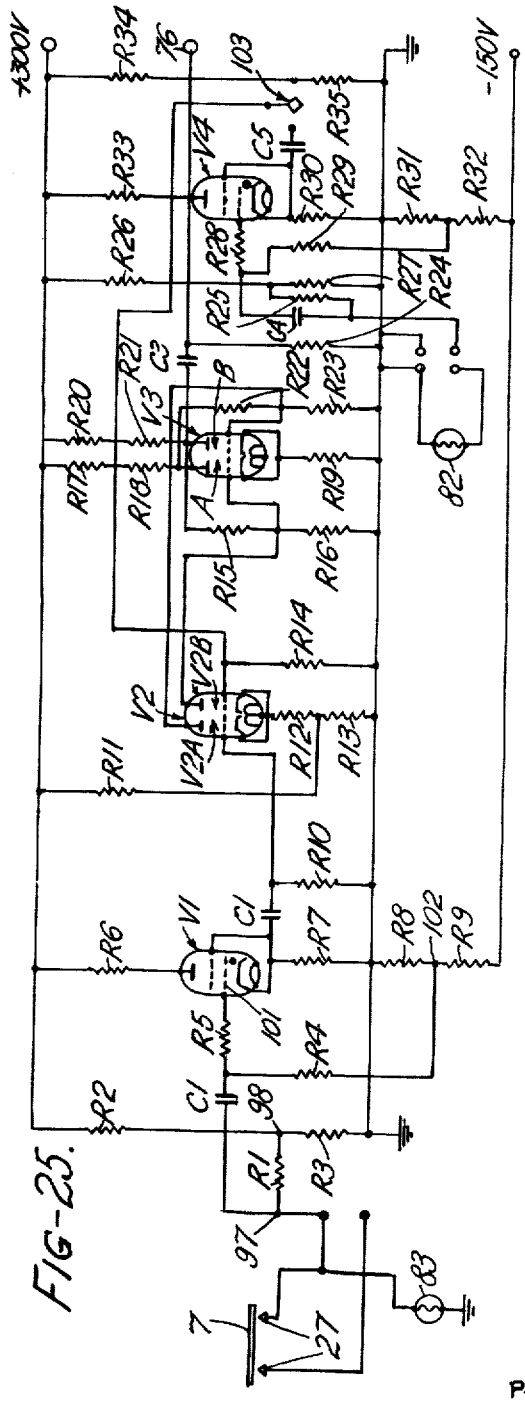

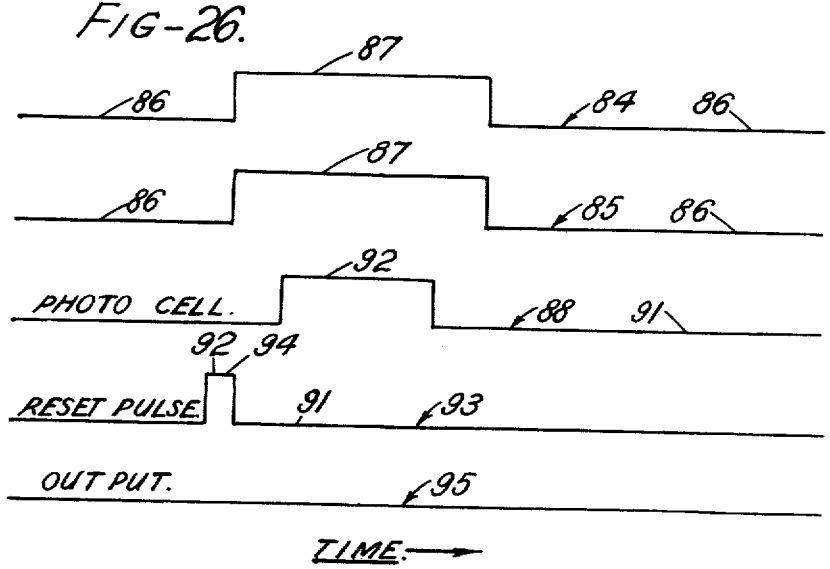
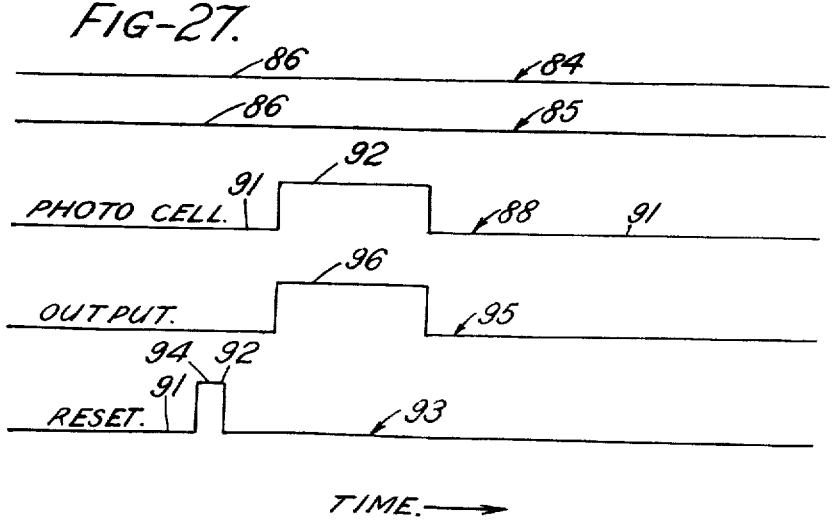

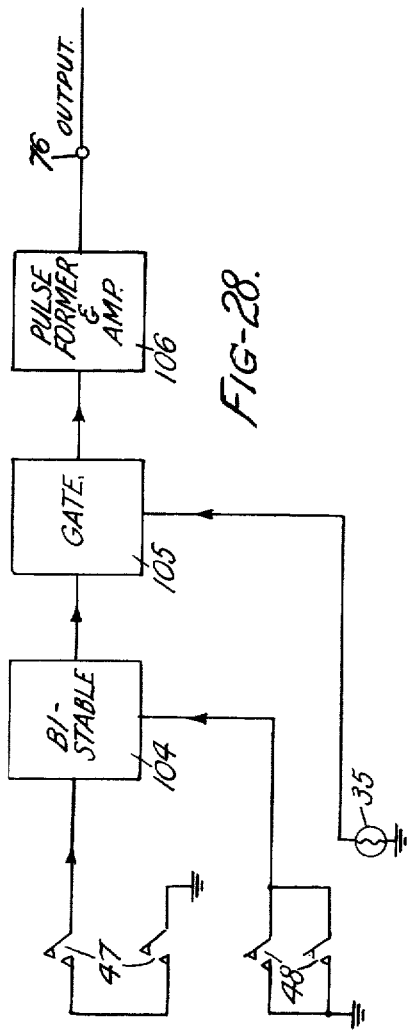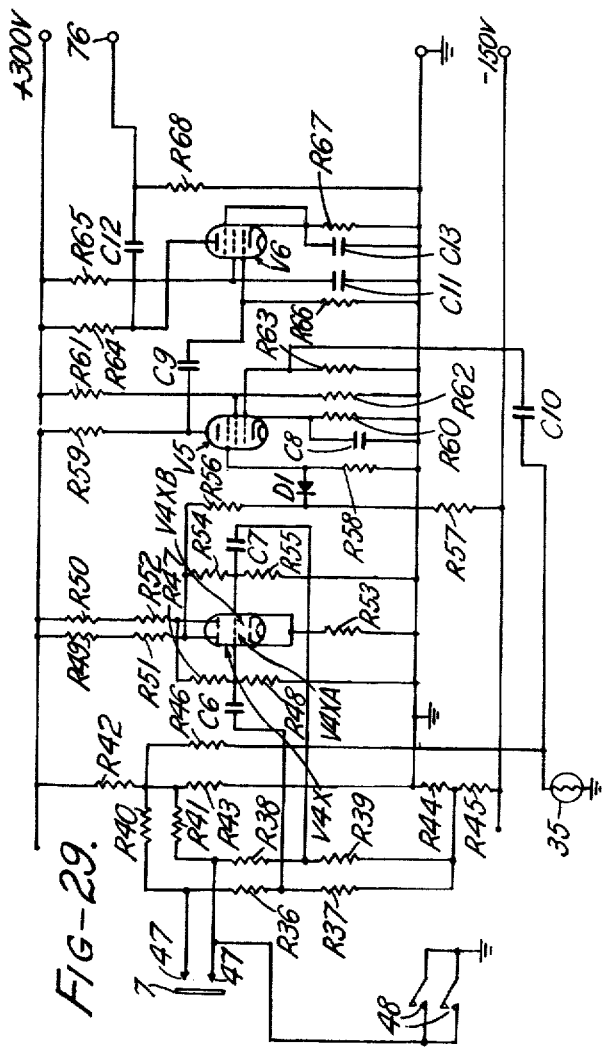

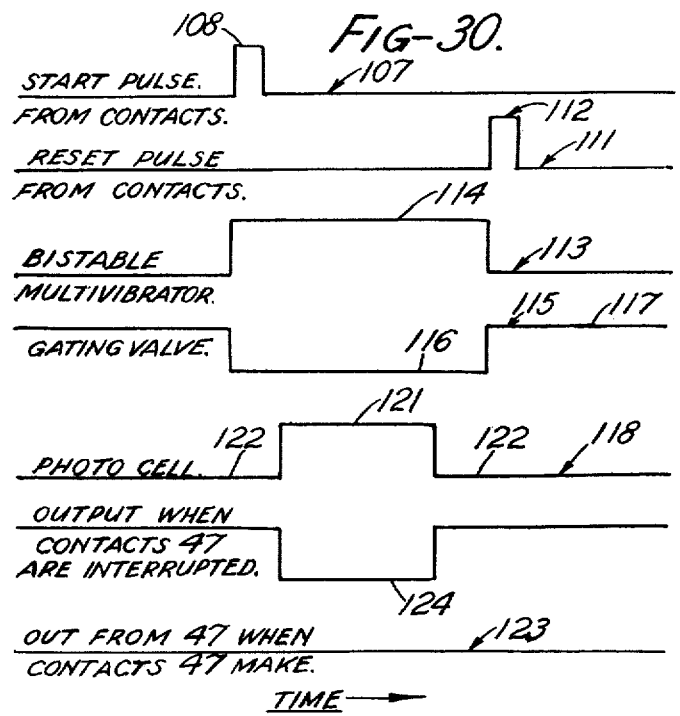

June 11, 1963   P. R. PRICE ETAL   3,093,729
APPARATUS FOR ACTING IN TURN ON SHEETS IN A PILE THEREOF
Filed Jan. 28, 1958   27 Sheets-Sheet 14

INVENTOR
P. R. PRICE ET AL
BY Mawhinney & Mawhinney

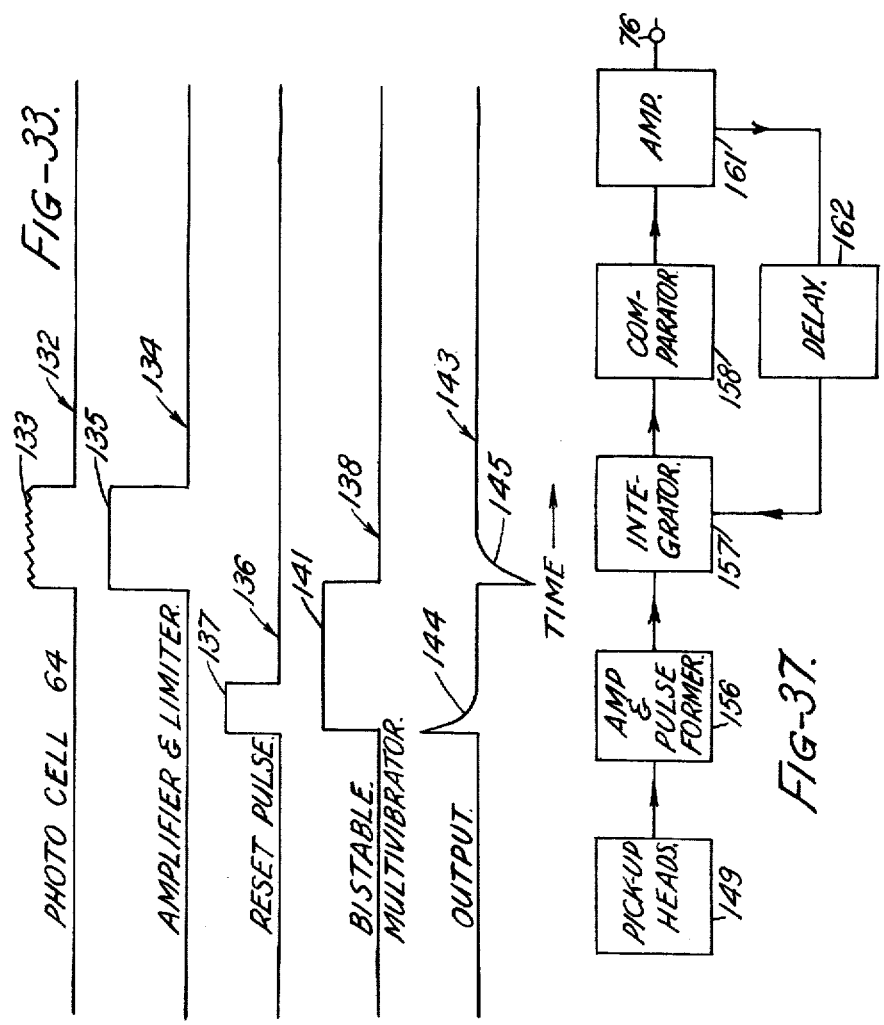

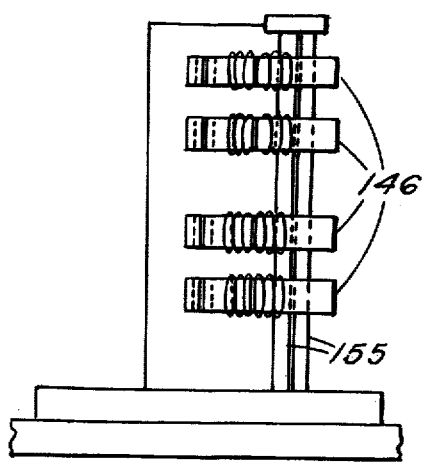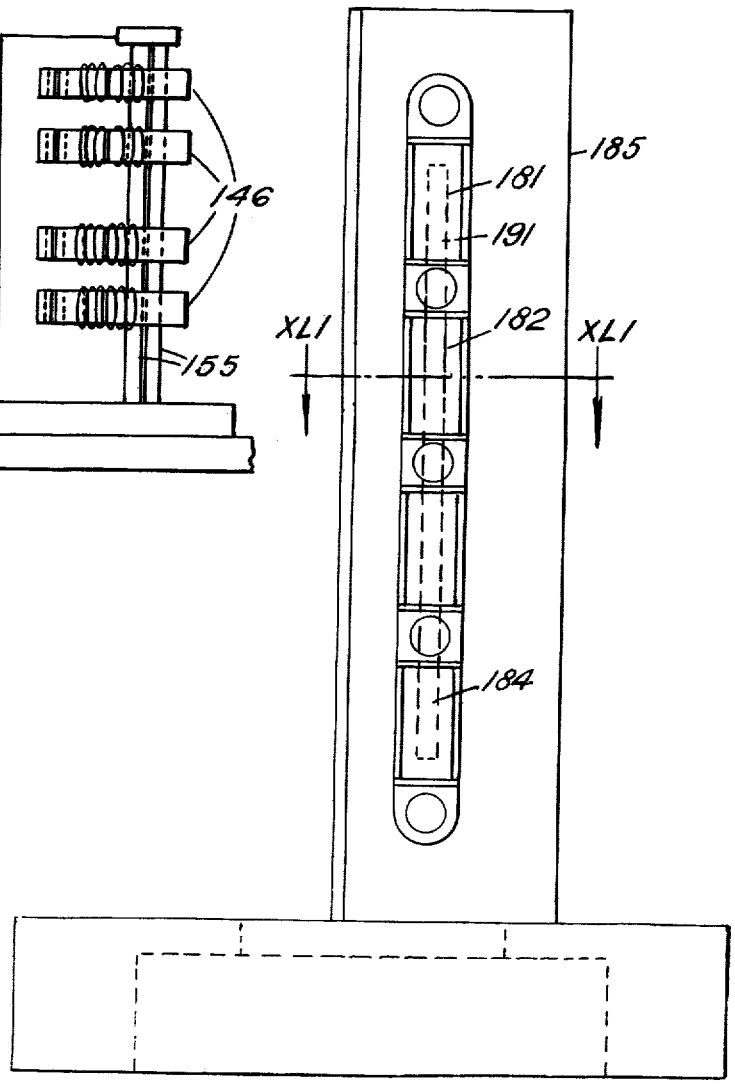

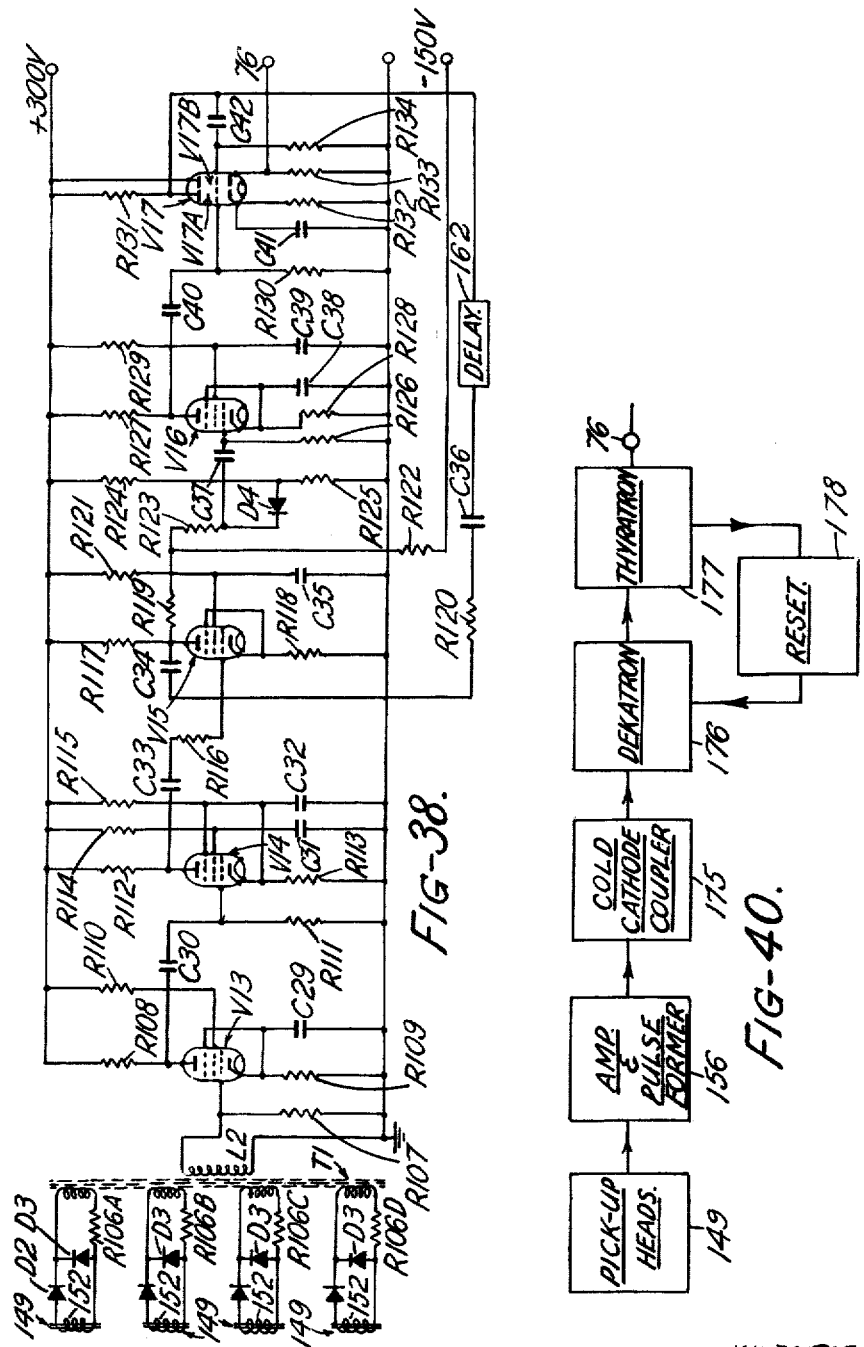

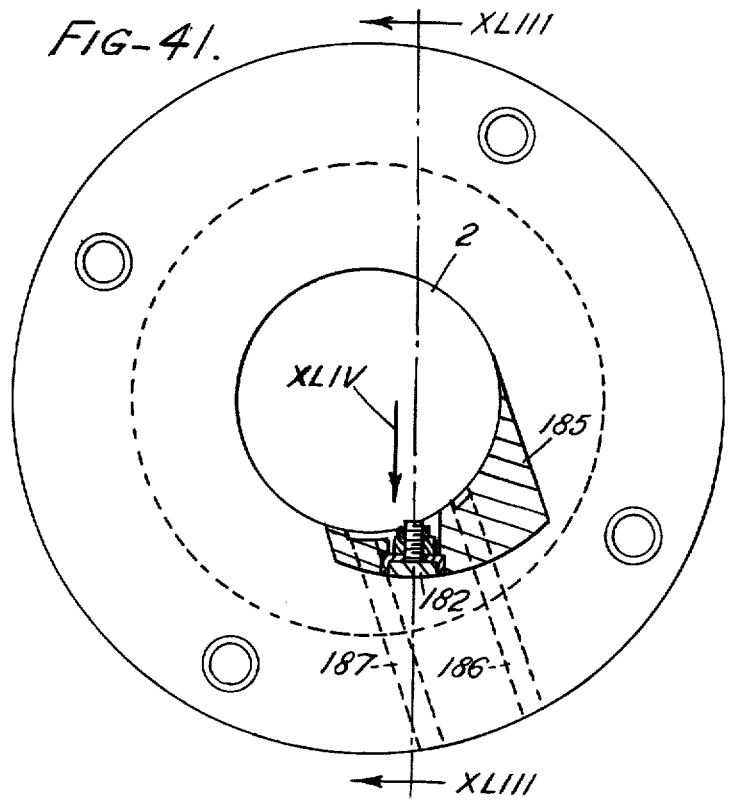
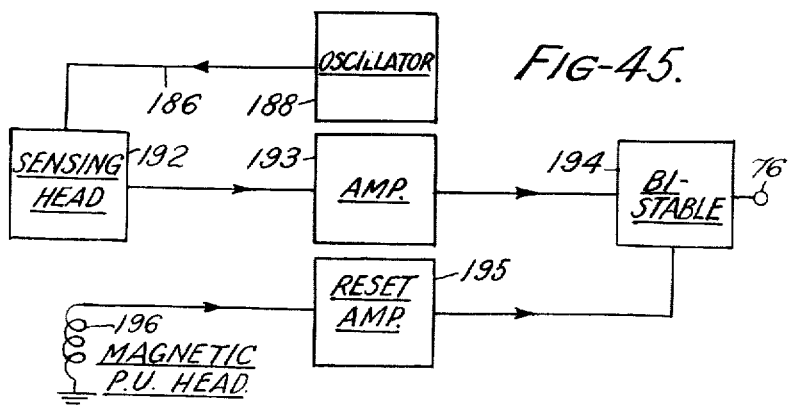

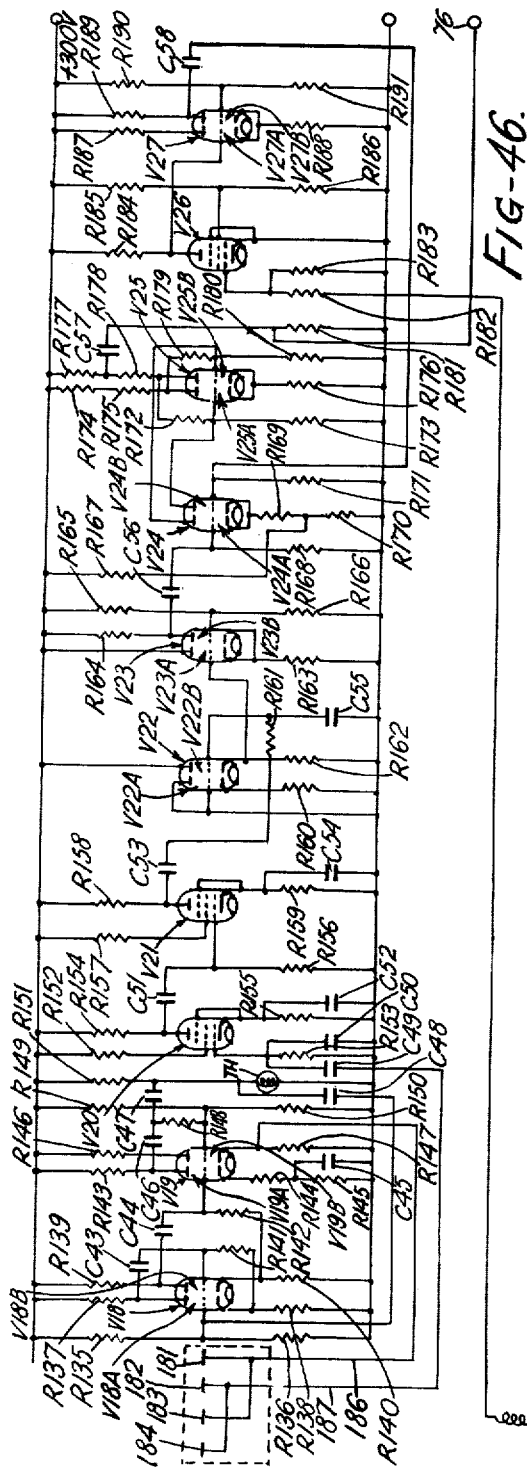

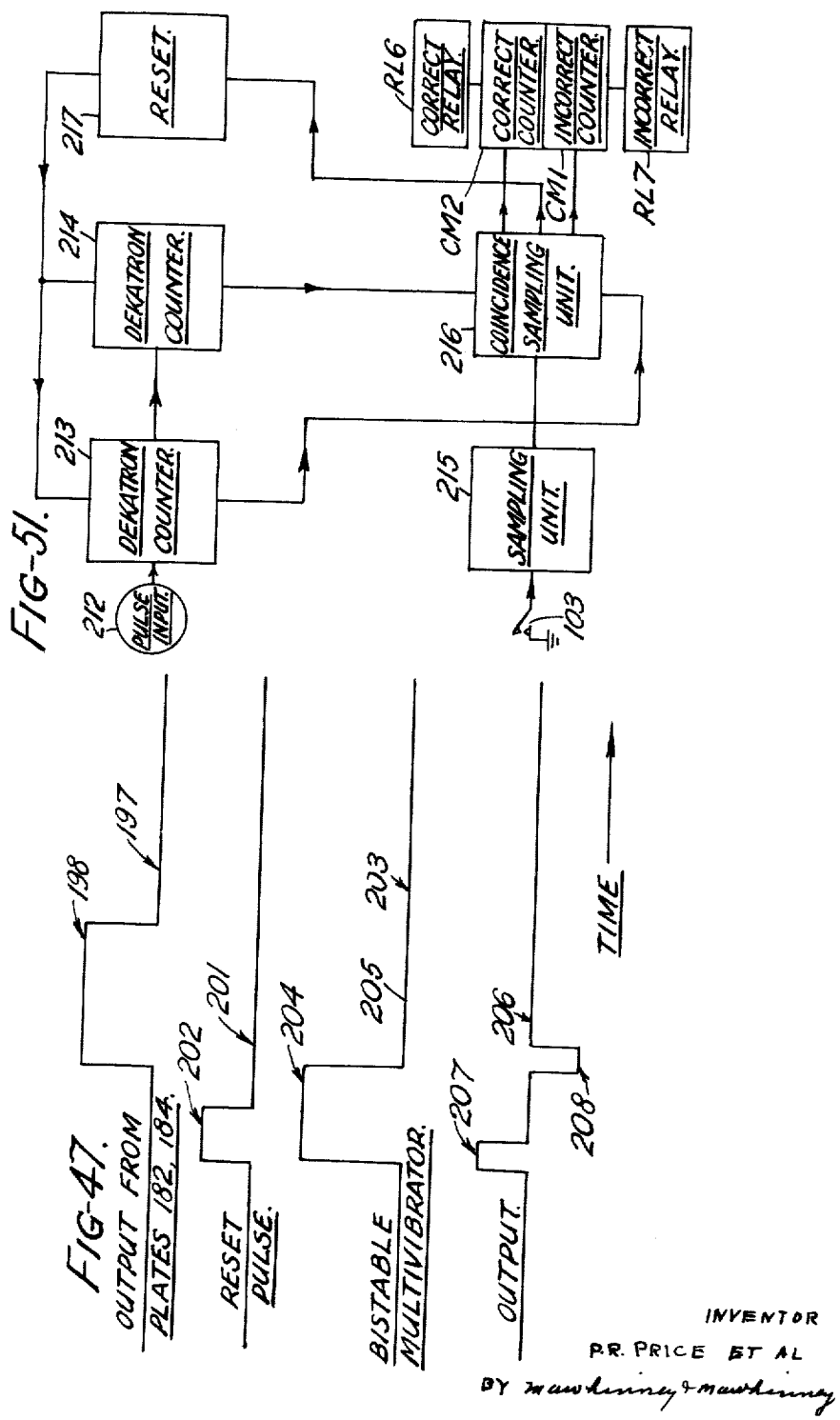

June 11, 1963 P. R. PRICE ETAL 3,093,729
APPARATUS FOR ACTING IN TURN ON SHEETS IN A PILE THEREOF
Filed Jan. 28, 1958 27 Sheets-Sheet 23
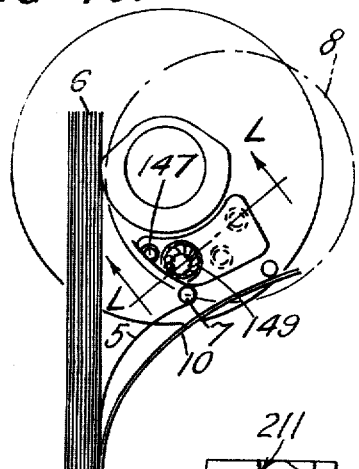
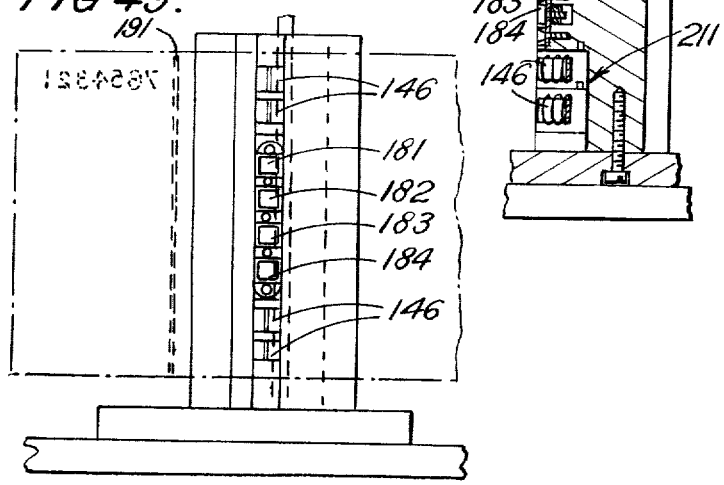
INVENTOR
P.R. PRICE ET AL
BY Mawhinney & Mawhinney

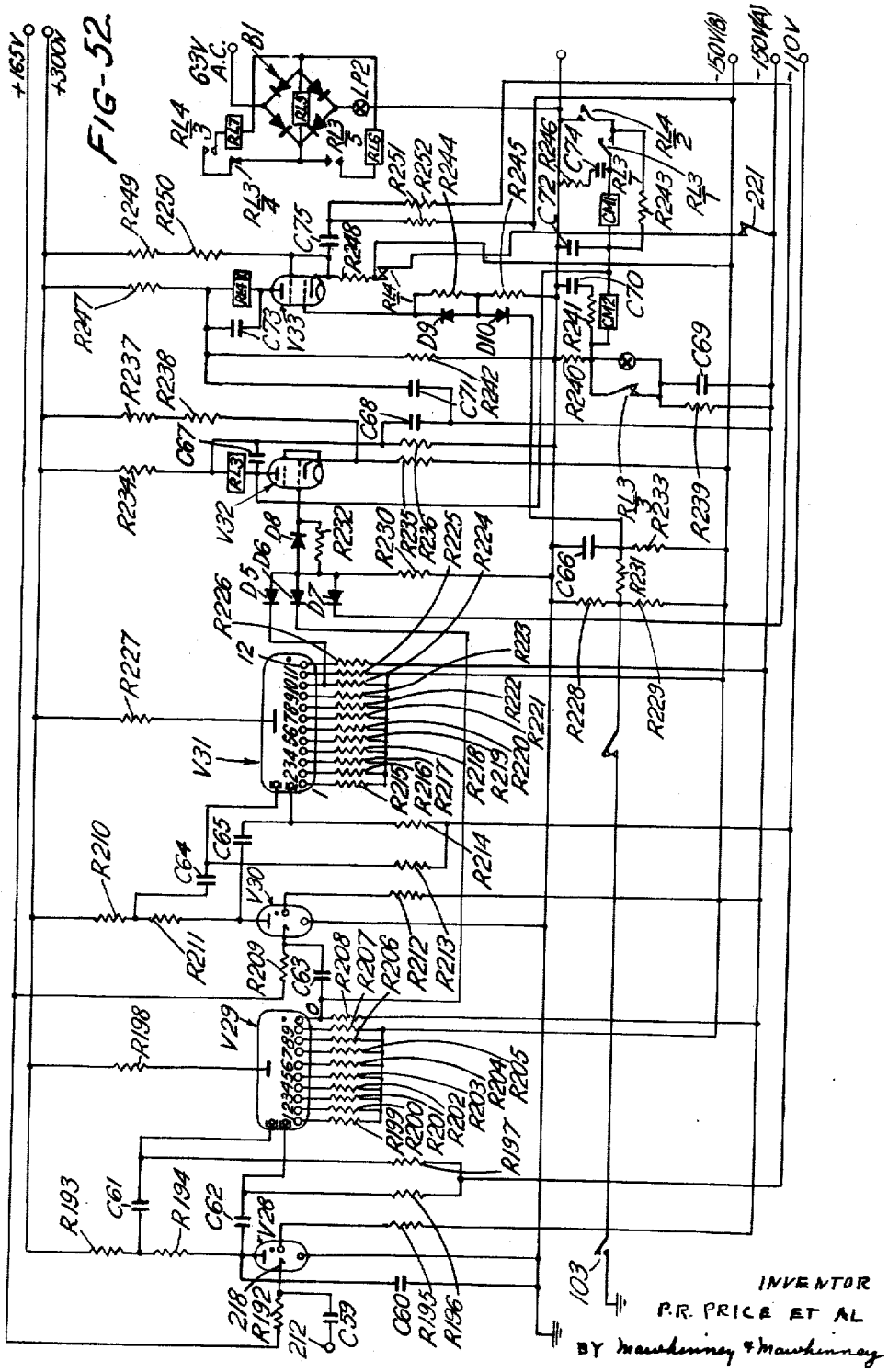

June 11, 1963  P. R. PRICE ETAL  3,093,729
APPARATUS FOR ACTING IN TURN ON SHEETS IN A PILE THEREOF
Filed Jan. 28, 1958  27 Sheets-Sheet 25

INVENTOR
P. R. PRICE ET AL
BY Mawhinney & Mawhinney

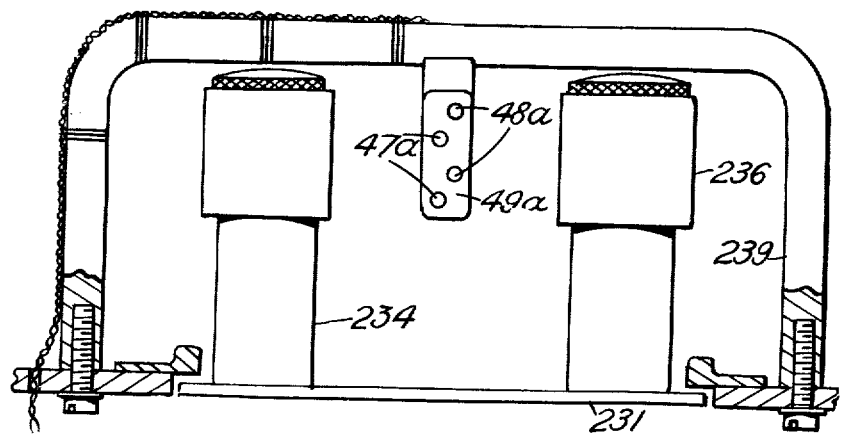
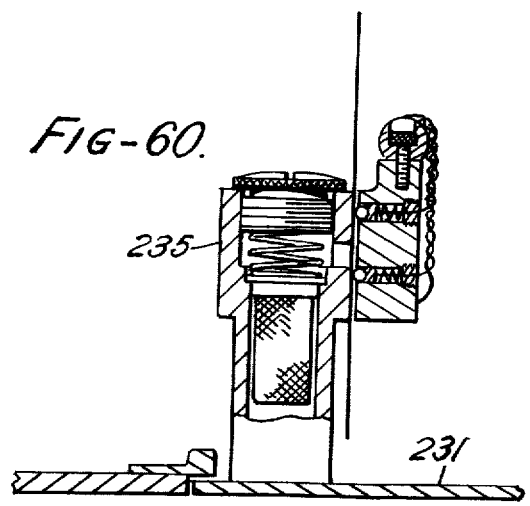

United States Patent Office 3,093,729
Patented June 11, 1963

3,093,729
APPARATUS FOR ACTING IN TURN ON SHEETS IN A PILE THEREOF
Peter Ralph Price and Geoffrey Buckle, Debden, Loughton, England, assignors to George Edmond Brackenbury Abell, London, England, and Henry Leveridge Chadder, Loughton, Essex, England
Filed Jan. 28, 1958, Ser. No. 711,641
Claims priority, application Great Britain Jan. 30, 1957
3 Claims. (Cl. 235—61.11)

The invention relates to apparatus for acting in turn on sheets, e.g. banknotes or other documents, in a pile, bundle or stack thereof and is more particularly concerned with such apparatus of the kind (hereinafter referred to as the kind described) comprising means (e.g. suction or friction means) for initiating separation of the documents individually in turn in the pile. Clamping or holding means are preferably provided for preventing complete detachment of the documents from the pile.

Separation-increasing means are usually provided for increasing the separation of each document after its separation has been initiated by the separation-initiating means.

The invention provides apparatus of the kind described, including sensing or verifying means for sensing or verifying the presence of a document at a particular stage of separation and/or for sensing a property or characteristic of each document in turn, or of part of each document in turn, which sensing or verifying means are adapted for operation separately or distinct from the operation of the separation-initiating means.

The apparatus may be constructed and arranged so that the sensing means serve to operate or control counting means for counting the documents, and/or to examine the documents e.g. to test for the presence of a particular physical property such for example as a metal, or metallised, thread in Bank of England banknotes, and/or to read data from the documents e.g. to read hte serial numbers of banknotes expressed as a code of localised variations of one or more physical properties thereof, e.g. marks or numerals printed on them in magnetisable ink.

Some specific constructions of apparatus embodying the invention will now be described by way of example and with reference to the accompanying drawings, in which:

FIGURE 1 shows one construction of apparatus for counting banknotes;

FIGURE 2 is a view of that apparatus, partly in section, as viewed from the position and direction indicated by the arrow I in FIGURE 1;

FIGURE 2A shows one of the contact brushes of FIGURE 2 to an enlarged scale;

FIGURE 3 is an inverted view from the position and direction indicated by the arrow III in FIGURE 2;

FIGURE 4 is a circuit diagram of the apparatus shown in FIGURES 1–3;

FIGURE 5 is a diagram showing the timing of the making and breaking of the electrical contacts of that apparatus;

FIGURE 6 is a side view of another construction of apparatus for counting banknotes;

FIGURE 7 is a laterally inverted view on the line VII—VII of FIGURE 6;

FIGURE 8 is a sectional view on the line VIII—VIII of FIGURE 7;

FIGURE 9 shows further detail of a photo-electric switch arrangement in the apparatus of FIGURES 6–8;

FIGURES 10 and 11 are views of an electro-magnetic switch arrangement which may be employed in the apparatus of FIGURES 1–3 or FIGURES 6–8;

FIGURE 12 shows another construction of apparatus for counting banknotes;

FIGURE 13 is a detailed view from the position and direction indicated by the arrow XIII of FIGURE 12;

FIGURE 14 is a sectional view on the line XIV—XIV of FIGURE 13;

FIGURES 15 and 16 are sectional views on an enlarged scale of the contact arrangements of FIGURES 12–14;

FIGURE 24 is a block diagram of a circuit which may be employed with the apparatus of FIGURES 6, 7, 8, 22 and 23;

FIGURE 24A is a block diagram of an alternative, and preferred, circuit which may be employed with that apparatus;

FIGURE 25 is a detailed diagram of the circuit shown in FIGURE 24A;

FIGURES 26 and 27 are timing diagrams of the circuit of FIGURES 24A and 25;

FIGURE 28 is a block diagram of an alternative circuit for use with the apparatus of FIGURES 12–16;

FIGURE 29 is a detailed diagram of the circuit of FIGURE 28.

FIGURE 30 is a timing diagram of the circuit shown in FIGURES 28 and 29;

FIGURE 33 is a timing diagram of the circuit of FIGURES 31 and 32;

FIGURE 34 shows a construction of apparatus for sensing characters printed in magnetisable ink on banknotes;

FIGURE 35 is another view of part of the apparatus of FIGURE 34;

FIGURE 36 shows on an enlarged scale a magnetic pick-up head employed in that apparatus;

FIGURE 37 is a block diagram of a circuit for use with the apparatus of FIGURES 34–36;

FIGURE 38 is a detailed diagram of the circuit of FIGURE 37;

FIGURE 40 is a block diagram of an alternative circuit for use with the apparatus of FIGURES 34–36;

FIGURES 41 and 42 show part of a construction of apparatus for sensing the presence of metal, or metallised threads in banknotes, FIGURE 41 being a sectional view on the line XLI—XLI of FIGURE 42;

FIGURE 45 is a block diagram of a circuit for use with the apparatus of FIGURES 41–44;

FIGURE 46 is a detailed diagram of the circuit of FIGURE 45;

FIGURE 47 is a timing diagram of the circuit of FIGURES 45 and 46;

FIGURE 48 shows a construction of apparatus for sensing the presence of both magnetisable numbers and metal, or metallised, threads in banknotes;

FIGURE 49 is another view of the apparatus of FIGURE 48;

FIGURE 50 is a sectional view on the line L—L of FIGURE 48;

FIGURE 51 is a block diagram of an electronic counting circuit for counting output pulses from any one of the circuits of FIGURES 24, 24A, 28, 31, 37, 40 and 45;

FIGURE 52 is a detailed diagram of the circuit of FIGURE 51;

FIGURE 59 is a view, partly in section, on the line LIX of FIGURE 58, and

FIGURE 60 is a sectional view on the line LX of FIGURE 58.

Figure 57:
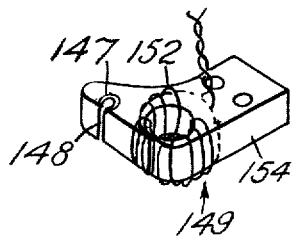
FIGURE 57 shows, on an enlarged scale, one of the magnetic reading heads of that apparatus.
Figure 56:
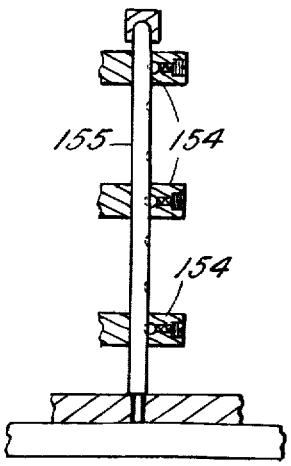
FIGURE 56 is a sectional view on the line LVI—LVI of FIGURE 54.
Figure 55:
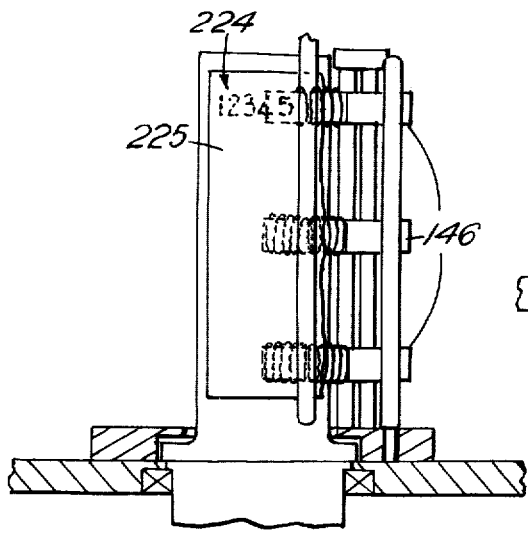

The apparatus to which FIGURES 1–57 of the drawings refer are modifications of that described in British specification No. 784,209. The separation-initiating means comprise in those examples a horizontally mounted tubular nozzle 1 connected to a vacuum source (not shown) by a pipe 20 (FIGURE 8) and encircled by a rotatable tubular slide valve 2 driven in a clockwise direction (as viewed in FIGURES 1, 7, 12, etc.) Once during each revolution of the tubular slide valve 2, an opening 3 of the tubular nozzle (see FIGURE 8) is in communication with openings 4 of the tubular slide valve 2 to attract the right hand banknote 5 of the pile 6 away from the other banknotes in that pile. The separation thus initiated is then increased by the separation-increasing means which comprise in these examples a rod-shaped release member 7 which moves in an anticlockwise direction (as viewed in FIGS. 1, 7, 12 etc.) around a circular path 8 the centre of which is eccentric to the axis of the tubular nozzle and slide valve. The release member 7 enters between the end of the note 5, which has been turned out by the separation-initiating means, and the other notes in the pile 6 and pulls the note 5, as indicated for instance in FIGURE 1, until that note 5 joins the previously separated notes 10.

It is preferable to test for the presence of a note late in the process of separation i.e. when the parts 2 and 7 are definitely between the note 5 and those left in the pile 6 and the proper separation of the note has been definitely assured. Switching means, as hereinafter described, are provided to render the sensing means operative only at that stage in each cycle of separation. In these examples the tubular nozzle 1 and rotatable slide valve 2 have their common axis vertical, instead of being horizontal as in the aforementioned British specification No. 784,209. The banknotes 5, 6, 10 are clamped together between a plate 9 and a plate 11 which is spring-urged towards the plate 9 and is provided with a handle 12 for moving the plate 11 to permit the insertion and removal of piles or bundles 6 (see FIGURES 1, 22, 23). The plates 9, 11 are pivotally mounted and are urged towards the slide valve 2 by a constant force spring.

In the construction shown in FIGURES 1–3, the sensing means include contact brushes 13 mounted on the release member 7 so that the brushes make contact with the tubular valve 2 during part of each revolution of the member 7 in the absence of a note between those brushes and the valve 2. When a note 5 is present and its separation from the pile 6 is being increased by the member 7, the note 5 intervenes between the brushes 13 and the valve 2, as shown in FIGURES 1 and 2, thereby preventing contact between the brushes 13 and the valve 2. The brushes 13 make contact with the valve 2 over the arc 14 shown in FIGURE 5, if no note 5 is present to prevent such contact. In FIGURE 5 the member 7 is shown in the position of its movement when it crosses the line 15 which corresponds to the line 15 shown in FIGURE 1, and the member 7 rotates in the direction of the arrow 16. A cam 17 is driven to rotate in synchronism with the member 7 and together with contacts 18 forms a mechanical contact breaker. The contacts 18 are operated by the cam 17 so as to be open over the arc 19 of FIGURE 5 and closed for the remainder of each revolution. An electromechanical counter 21 is connected as shown in FIGURE 4.

It will be seen from FIGURE 4 that the connection of the supply to the counter 21 is continuous if no note 5 is present between the valve 2 and the brushes 13. Presence of a note 5 during the arc 19 insulates the brushes 13 from the valve 2, and the supply to the counter is therefore interrupted by the contact breaker 17, 18 during the arc 19. This releases the counter armature and the unit wheel of the counter 21 moves on half a step. The counter armature is then attracted as the contact breaker closes the contacts 18 and the unit wheel moves another half step to count one unit, indicating the presence of a note 5. No current is broken by the brushes 13 at any time.

The rod shaped release member 7 is fixed in a crank 22 which is rotated by a shaft 23 to which the cam 17 is also attached. The valve 2 is connected to earth, and in order to insulate the sensing brushes 13 from earth, the crank 22 and a slip ring boss 24 are made in insulating material e.g. "Carp Brand Tufnol." Connection to the brushes 13 is made through a slip ring 25, mounted on the insulating boss 24, and a contact brush 26.

A single brush 13, or any other convenient number of brushes, may be employed instead of three such brushes.

In the construction shown in FIGURES 6–9, stationary contacts 27 mounted on an insulating member 28 are employed for making contact with the rod 7, instead of the contact brushes 13 making contact with the valve 2. One of the contacts 27 is earthed and the other is connected to the electro-mechanical counter 21 instead of the brushes 13 being so connected as in FIGURE 4. The rod 7 completes an electric circuit between the contacts 27, over the arc 19 of FIGURE 5, when no note 5 is present to prevent such connection.

The contacts 27 are made of a suitable contact material e.g. Phosphor bronze-silver bimetal strip, and the insulating member 28 is made of a suitable insulating material e.g. "Carp Brand Tufnol." In this construction the rod 7 is rotatably mounted in bearings 29 in the crank 22a. That crank is made of insulating material or, alternatively, a bush of insulating material is used to mount the crank on the shaft 23.

In this particular construction the mechanical contact breaker 17, 18 is replaced by a photo cell pulse generator 31 comprising a rotating transparent disc 32 mounted on the shaft 23 and having an opaque sector 33 which becomes interposed once per revolution between a lamp 34 and a photoelectric cell 35. The photo cell pulse generator is provided with a dust proof cover 36. The photo cell pulse generator 31 thus provides a pulse while the opaque sector 33 prevents illumination of the photo cell 35, and that pulse is employed to provide a connection to earth from the electro-mechanical counter 21, through a path replacing the contacts 18, over the arc of revolution 14 (FIGURE 5). The output from the pulse generator 31 may, for example, be used to fire and reset a thyratron for that purpose.

The thickness of the rotary slide valve 2 is reduced around part of its periphery and that part is shaped as shown at 37. Because of the shaping 37 the rod shaped release member 7 occupies a position when it is nearest to the pile 6 (i.e. on the line 15) such that the part of the surface of the member 7 which touches the pile 6 is in the position previously occupied by the main part 38 of the periphery of the valve 2. In that way there is the minimum of interference between the member 7 and the pile 6 and oscillation of the pile 6 is kept to a minimum. In addition, the eccentricity between the axes of movement of the valve 2 and the member 7 is increased thereby providing additional room for the member 28 and contacts 27 or other sensing devices.

The electro-magnetic switch arrangement shown in FIGURES 10 and 11 may be employed in place of the photo cell pulse generator 31. That electro-magnetic switch comprises a soft iron core 39 mounted in an insulated former 41 on which a coil 42 is wound. The coil 42 consists in this example of 5,000 turns of 47 S.W.G. enamelled copper wire and an insulated shroud 43 is provided over the coil. A permanent magnet 44 is mounted on a boss 45 secured to the shaft 23 which drives the release member 7. The magnet material in this example is "Mullard Ticonal 1152." The ends of the coil are connected to terminals 46 and a pulse is thus provided at those terminals once in each revolution of the shaft 23.

In the construction shown in FIGURES 12–16 the contacts 27 are replaced by two sets of spring-urged ball contacts 47, 48 mounted in a member 49. As the release member 7 moves along its path 8 it comes into alignment with the two ball contacts 47 and, in the absence of a note 5, it provides an electrical connection between the two balls 51 of the contacts 47. The balls 51 are in contact with a cup 52 to which is attached a conductor 53 and which is acted on by a helical compression spring 54. The member 7 then leaves the balls 51 and, whether or not a note 5 is present, it depresses the two balls 55 of the contacts 48 thereby making contact between the stem 57 of a cup 56 and a member 58, which are attached respectively to conductors 61 and 62. The member 7 is carried by an insulating crank 22 as in FIGURE 6.

Figure 17:
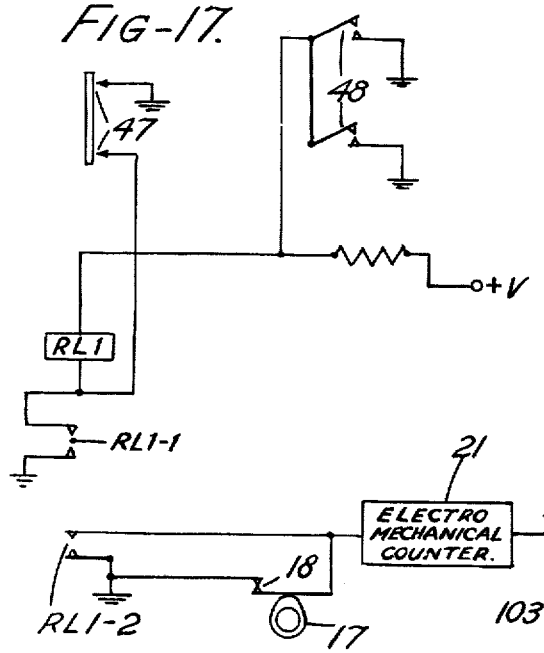
FIGURE 17 is a circuit diagram of the apparatus shown in FIGURES 12–16.

The contacts 47 and 48 are connected in the circuit shown in FIGURE 17. That circuit includes a relay RL1 (in this example a "Siemen's high speed relay" having a contact make time of the order of 1 millisecond). That relay has normally open holding contacts RL1–1 and normally open contacts RL1–2. When no document 5 is present as the release member 7 slips past the contacts 47, 48, the contacts 47 are thereby bridged and cause energisation of the relay RL1, whereupon the contacts RL1–1 close and maintain the relay in operated condition. The contacts RL1–2 also close and they are in parallel with contacts 18 operated by a cam 17 as in FIGURE 3. When the contacts 48 are subsequently closed they cause the relay RL1 to become de-energised, thereby opening the contacts RL1–1 and RL1–2. The contacts RL1–2 thus replace the contacts 2, 13, of FIGURE 4.

Figure 18:
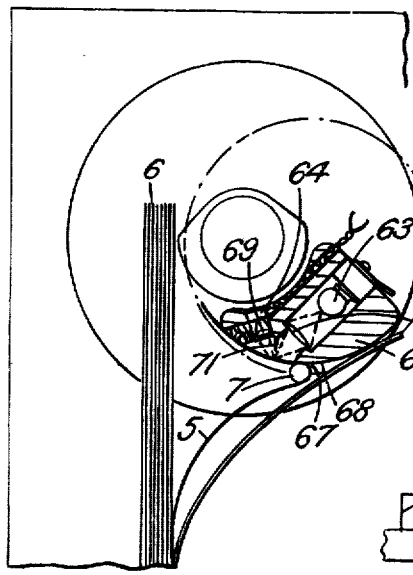
FIGURES 18 and 19 show another construction of apparatus for counting banknotes, FIGURE 18 including a sectional view on the line XVIII—XVIII of FIGURE 19.
Figure 19:
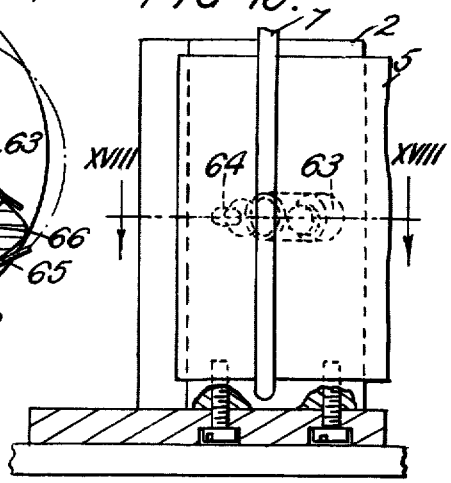

In the construction shown in FIGURES 18 and 19 the presence of a note 5 is sensed by means of a lamp 63 and a photo-electric cell 64 which are mounted in a cavity in a member 65. That member 65 is secured in a similar manner to the members 28 of FIGURE 7 and 49 of FIGURE 12. A lens 66 focuses light from the lamp 63 through an opening 67 in the member 65. The focal point is in the same plane as the outer surface 68 of the member 65 so that when a note 5 is drawn over that surface light is reflected on to the photo cell 64, being focused by a lens 69. In order to prevent light from falling on to the photo cell 64 other than when reflected by the note 5 a shield 71 is provided. The rod shaped release member 7 is finished, for example with "gun black," so that it does not reflect light on to the photo cell when no note 5 is present.

When sensing used notes or other documents very little light may be reflected on to the photo cell 64 due to dirt and the like on the surface of the document. Preferably the photo cell 64 is of high sensitivity e.g. a "Hilger and Watts cadmium-selenide cell" as described in British patent specification No. 685,288.

Figure 20:
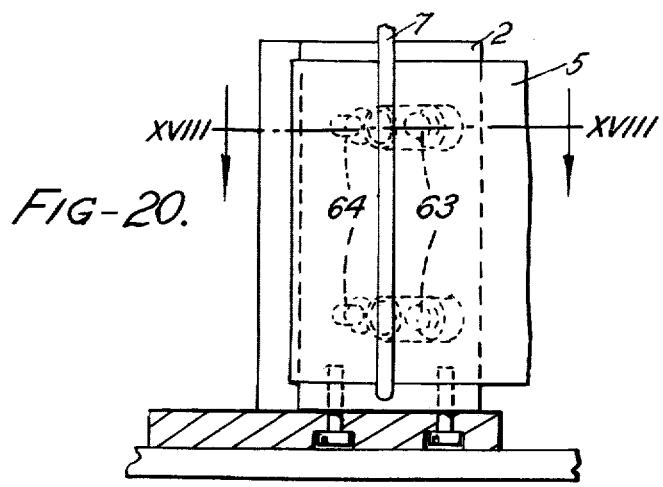
FIGURE 20 is a view, similar to FIGURE 19, of a modification thereof.

The lamp and photo cell arrangement just described may be duplicated as indicated in FIGURE 20 and the two photo cells 64 may be connected in parallel. With this arrangement if all or part of the note or other document is missing from over one of the cells, the second cell will detect the part of the note which is present.

Figure 21:
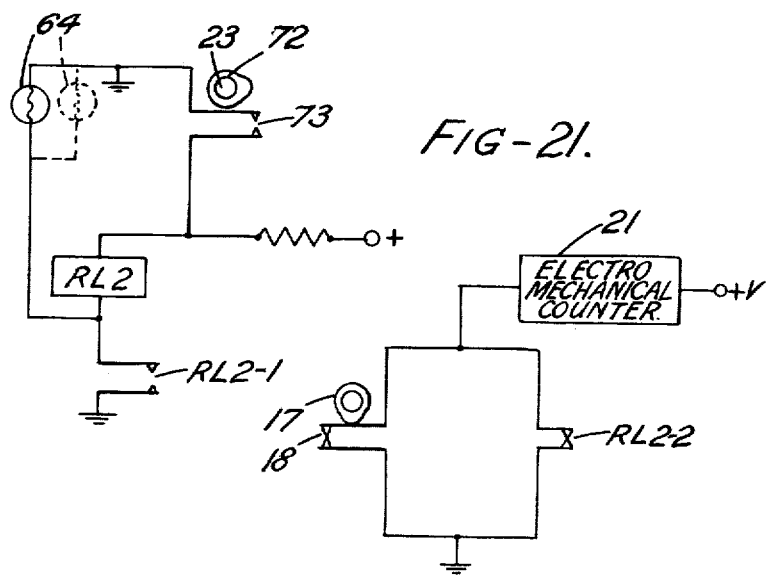
FIGURE 21 is a circuit diagram of the apparatus shown in FIGURES 18–20.

The photo cell, or photo cells, 64 are connected in the circuit shown in FIGURE 21. That circuit includes a relay RL2 having normally open holding contacts RL2–1 and normally closed contacts RL2–2. The photo cell or photo cells 64 are not conductive unless light is reflected on to it or them by the note 5. When the cells 64 are not conductive the relay RL2 cannot be energised through it or them. When a note 5 is present a photo cell 64 conducts and causes energisation of the relay RL2, the contacts RL2–1 close and maintain the relay energised. An additional cam 72 is mounted on the shaft 23 and closes contacts 73 for a short period, once per revolution of the shaft 23, for the purpose of causing de-energization of the relay RL2 in order to reset that relay. During the time that the relay RL2 is energised the contacts RL2–2 are open, and the electro-mechanical counter 21 moves forward one step when the contacts 18 open and close.

The various forms of contacts 13, 27, 47, 48 and photo-electric sensing arrangements, described in the foregoing examples may each be employed with any of the various forms of contact breaker 17, 18 photo cell pulse generator 31 or electro magnetic switch (FIGURES 10 and 11).

The constructions described in the foregoing examples may be employed in conjunction with electronic counting apparatus instead of an electro-mechanical counter. For instance the apparatus of FIGURES 6–9 may be employed with the circuit shown in FIGURE 24 to provide pulses for the electronic counting circuit of FIGURES 51 and 52. The circuit of FIGURE 24 comprises an "and gate" 74 and a monostable multi-vibrator 75, and has the contacts 27, the release member 7 and the photo cell 35 connected as shown. It has an output terminal 76. Contact brushes 13 as shown in FIGURES 1–3, may be employed instead of the contacts 27. The counting arrangement may be prevented from accepting more than one pulse per revolution of the release member 7, by inhibiting the counter input after the pulse to be counted has been received, thereby giving a counter paralysis time. The paralysis time can be set in dependence upon the speed of operation of the apparatus and may be dependent on the time constant of a capacity-resistance network.

Figure 22:
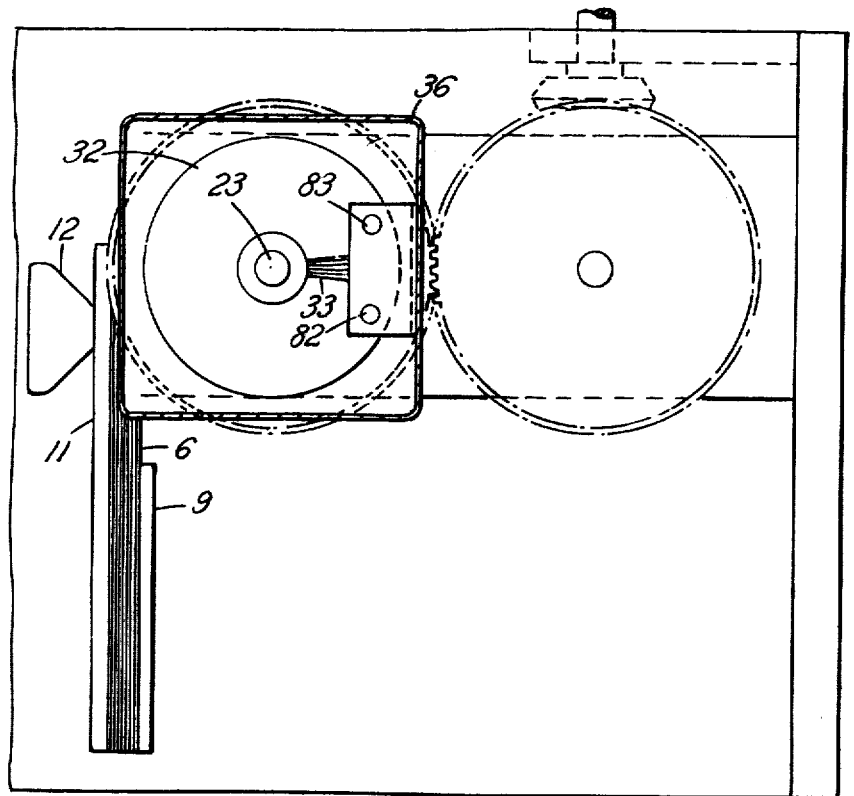
FIGURE 22 shows a modification of the apparatus of FIGURES 6–9.

It is preferred to use the circuit of FIGURES 24A and 25. That circuit comprises an "and gate" 77, an amplifier and pulse former 78, a bi-stable circuit 79 and a reset pulse former 81. In this arrangement the construction of FIGURES 6–9 is modified as shown in FIGURE 22 by the provision of two photo cells 82, 83 instead of a single photo cell 35. Two lamps 34 (not shown in FIGURE 22) are provided opposite the photo cells 82, 83 respectively. The photo cell 83 provides a pulse for the "and gate" 77, and the photo cell 82 provides a reset pulse. The timing of the operation of the various parts of the circuit is shown in FIGURES 26 and 27, FIGURE 26 showing the sequence of operations when there is no note 5 present during one cycle of operation of the apparatus, and FIGURE 27 showing the sequence of operations when there is a note 5 present during a cycle. In these timing diagrams, and in the other timing diagrams of this specification, the timing sequence is shown as occurring from left to right across the figures. The lines 84 and 85 refer respectively to the two contacts 27 and the release member 7. Over the parts 86 of the lines 84 and 85 those contacts are open, and over the parts 87 they are closed. The lines 88 indicate the condition of the photo cell 83. The lines 93 indicate the condition of the photo cell 83, which provides reset pulses 94. Over the parts 91 of those lines the photo cell 82 or 83 is non-conducting, and over the part 92 it is conducting. The lines 95 indicate the output voltage of the valve V3, which voltage provides a pulse 96 in the case of FIGURE 27.

When no note 5 is present the end 97 of the resistor R1 of FIGURE 25 is connected to earth through the contacts 27 and the release member 7, and that end 97 is also connected to earth while the photo cell 83 is illuminated and therefore conducting. When however, a note 5 is present between the contacts 27 and the member 7 while the photo cell 83 is non-conducting, the potential of the point 97 will rise to a positive value approximately equal to the potential existing at the junction 98 between the resistors R2, R3, which is normally set at about +75 volts. The control grid 101 of the thyratron V1 is normally held at about −75 volts by the potential obtained from the junction 102 of the resistors R8 and R9. When however the potential of the point 97 rises as aforesaid this overcomes the negative bias on the control grid 101 and thereby switches on the thyratron V1. A positive potential therefore appears across the resistor R7 and remains until the thyratron is switched off. The valve V2A is normally held in a non-conducting state by the voltage at the junction of resistors R11 and R13. When the aforesaid positive potential appears across the resistor R7 a positive pulse is thereby applied to the control grid of the valve V2A which is thereby caused to become conducting. This in turn causes the bi-stable multivibrator circuit of valve V3 to change from one of its stable states to the other, thereby providing an output 96 from the valve V3B, which output is differentiated by the capacitor C3 and the resistor R24 to provide an output pulse at the terminal 76.

Figure 23:
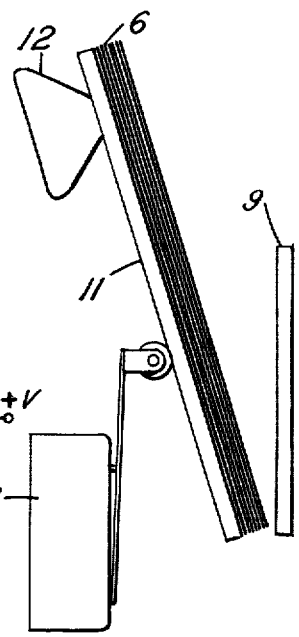
FIGURE 23 shows a feature which may be embodied when appropriate in the apparatus of FIGURES 6–8 and FIGURE 9 or FIGURE 22.

The bi-stable multivibrator is reset by the pulse 94 from the photo cell 82, which fires the thyratron V4, giving a positive pulse at the control grid of the valve V2B. A switch 103 is provided for setting the bi-stable multivibrator to a particular known one of its two stable states before a count is started. The switch 103 is preferably mounted for operation by the clamping plate 11, as shown in FIGURE 23, when that clamping plate is moved to permit the removal of one pile of notes and its replacement by another.

The circuit shown in FIGURES 28 and 29 may be employed with the construction shown in FIGURES 12–16 together with a photo cell pulse generator as shown in FIGURE 9. The circuit of FIGURE 28 comprises a bi-stable circuit 104, a gate 105, and a pulse former and amplifier 106. In the timing diagram, FIGURE 30, the line 107 refers to the contacts 47 which provide a pulse 108 when a document 5 is present, and the line 111 relates to the contacts 48 which provide a reset pulse 112. The line 113 relates to the bi-stable multivibrator circuit 104 which provides a pulse 114, the line 115 relates to the gate 105, which is closed over the part 116 and is open over the parts 117, the line 118 relates to the photo cell 35 which is non-conducting over the part 121 and conducting over the parts 122, lines 123 relate to the output potential at the output of the valve V6, which provides a pulse 124 if the contacts 47 are prevented from closing by the presence of a note 5 during the cycle.

If a document 5 is not present at the appropriate time in the cycle, the contacts 47 are connected in series to earth when the release member 7 passes over them.

If both of the contacts 47 are made, a positive pulse is applied to the control grid of the valve V4XA, which is one half of the valve V4X which is connected as a bi-stable multivibrator. That pulse causes the multivibrator to change from one of its stable states to the other and thereby causes the valve V5 to cut off. Consequently if a pulse is then applied to the control grid of the valve V5 from the photo cell 35 it is inhibited by the valve V5 being in a non-conducting state. The multivibrator is reset by the positive-going pulse obtained by the operation of the contacts 48. When either of the contacts 47 are interrupted by the presence of a note 5 the bi-stable multivibrator remains in the state in which the valve V4XA is conducting, and the gate valve V5 functions as an amplifier. If a pulse is applied from the photo cell 35 during the period when the contacts 47 are open, then an amplified and shaped pulse is provided by the valve V6, and this is differentiated by the capacitor C12 and resistor R68 to give the output at the output terminal 76.

Figure 31:
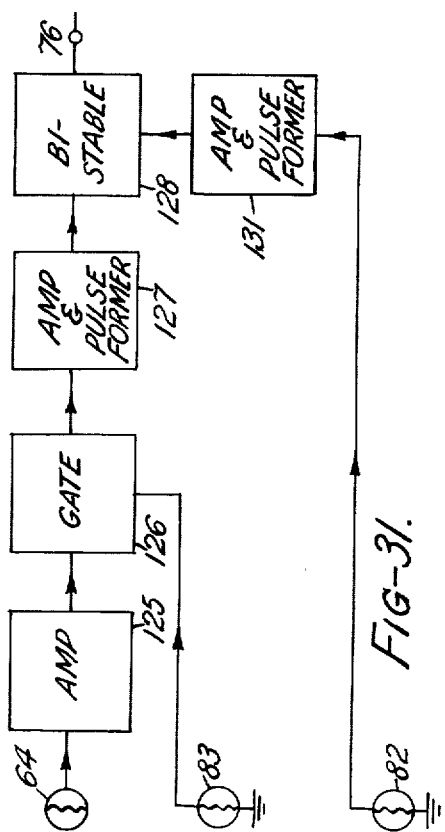
FIGURE 31 is a block diagram of a circuit for use with the apparatus of FIGURES 18–20.
Figure 32:
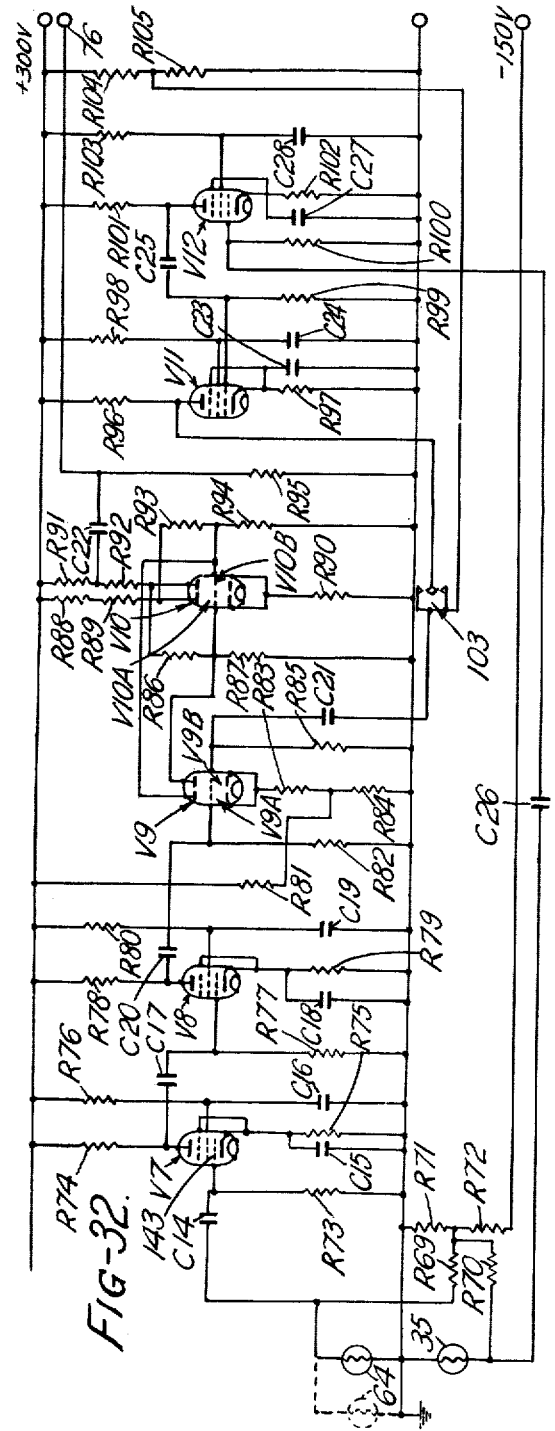
FIGURE 32 is a detailed diagram of the circuit of FIGURE 31.

The construction of FIGURES 18 and 19, or 18 and 20, together with the arrangement shown in FIGURE 22, may be employed with the circuit shown in FIGURES 31 and 32.

The circuit of FIGURE 31 comprises an amplifier 125, a gate 126, an amplifier and pulse former 127, a bi-stable circuit 128 and an amplifier and pulse former 131.

In the timing diagram, FIGURE 33, the line 132 relates to the photo cell 64, which is conducting for the period 133 when it is illuminated by reflection from a note 5, the line 134 relates to the output of the amplifier and pulse former or limiter 127 which provides a pulse 135, the line 136 relates to the output of the amplifier and pulse former 131 and provides a reset pulse 137, the line 138 relates to the bi-stable multivibrator 128 which changes its state to provide a pulse 141, and the line 143 relates to the potential of the output terminal 76.

When the photo cell 64 is illuminated and conducts a positive pulse is applied to the control grid 143 of the valve V7. The two pentode valves V7 and V8 form a high gain amplifier and limiter so that the resultant positive pulse 135 at the anode of valve V8 is of constant amplitude.

The two double triodes V9 and V10 form the gate valve and the bi-stable multivibrator. A positive pulse applied to the control grid of the valve V9A, from an anode of the valve V8, causes the multivibrator to change from one of its stable states to the other. The multivibrator V10 is reset by a resetting pulse 137 obtained by the amplifying and limiting action of the valves V11 and V12 on the output pulse from the photo cell 35 or 82. The output from the anode of the valve V10B is differentiated by the capacitor C22 and the resistor R95, so that for each count a positive-going pulse 144 and a negative-going pulse 145 is provided at the output terminal 76. The switch 103 is provided as shown in FIGURE 23 and is employed to set the multivibrator to a known one of its two stable states before a count is begun.

In the construction shown in FIGURES 34–36 four magnetic reading heads 146 are provided for sensing the presence of numbers printed in magnetisable ink on banknotes. That particular arrangement of four reading heads is employed with banknotes which each have two serial numbers printed in magnetisable ink in predetermined positions. Four reading heads are required as either end of the note may be presented to the separating and sensing mechanism and either face of the note may be directed towards it.

Each of the reading heads 146 comprises a circular-section permanent magnet 147 having a gap 148 across which a magnetic field is established by a magnet. As the printing on the bank note 5 passes through that magnetic field, the magnetisable ink on the banknote becomes magnetised. The reading head 146 also includes a magnetic pick-up head 149 comprising a core 151 of high permeability magnetic material e.g. that known under the trade names "Hymu 80" laminations or "Ferroxcube." The core 151 is provided with a winding 152 and as a gap 153 which in this example is an air gap but may alternatively be filled with non-magnetic material. As the magnetised printing on the note 5 passes over the gap 153 an E.M.F. is induced in the winding 152. The permanent magnet 147 and the pick-up head 149 are wider than the height of the printed numerals to be sensed and they are supported by being cast in a block 154 of insulating material, such as "Araldite Casting Resin D." The Blocks 154 are supported on rods 155.

If a complete serial number is magnetised then a pulse may be derived from each digit of that number, for example the number 1000000 will in this example provide seven negative-going pulses in one of the windings 152. In order to count the complete serial numbers on, for example, a dekatron counter, only one pulse is required in respect of each complete member. In this example the seven pulses from a seven digit serial number are added together and formed into one pulse, which is counted.

Figure 39:
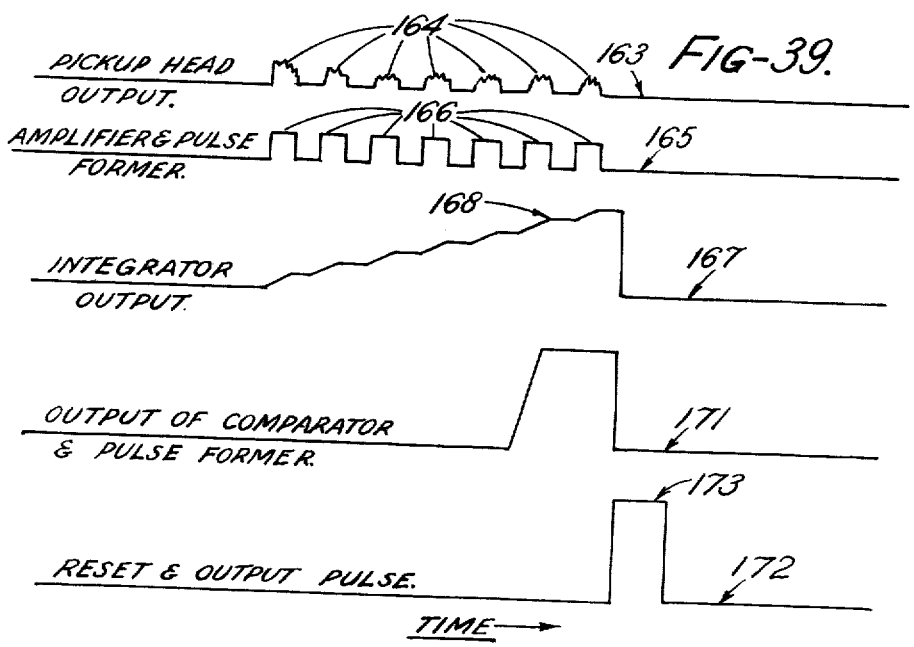
FIGURE 39 is a timing diagram of the circuit of FIGURES 37 and 38.
Figures 43, 44:
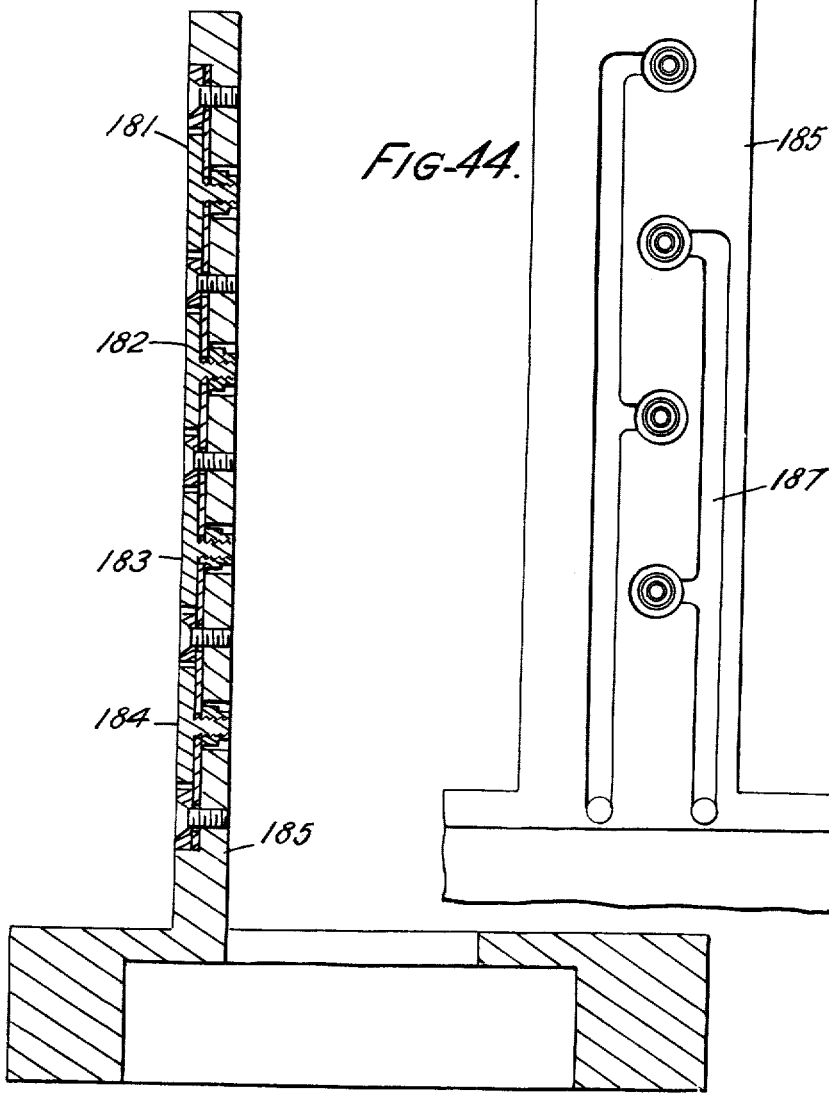
FIGURE 43 is a part sectional view on the line XLIII—XLIII of FIGURE 41.
FIGURE 44 is a detail view from the position and direction indicated by the arrow XLIV of FIGURE 41.
Figure 54:
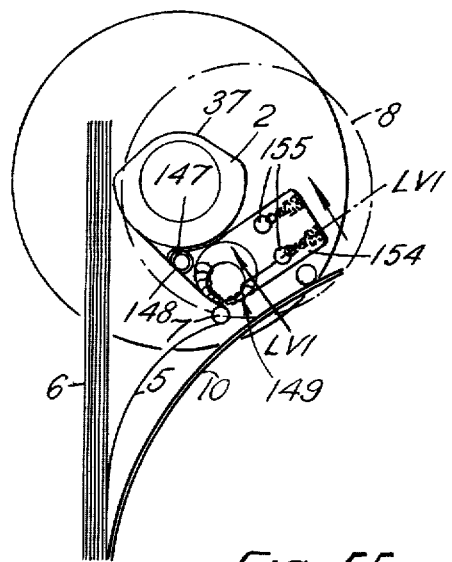
FIGURES 54 and 55 show apparatus for reading from documents characters printed in magnetisable ink.

The apparatus of FIGURE 34 and 36 is employed with the circuit shown in FIGURES 37 and 38. That circuit comprises the pick-up heads 149, an amplifier and pulse former 156, an integrator 157, a comparator 158, an amplifier 161, and a delay circuit 162. In the timing diagram, FIGURE 39, the line 163 relates to the output of the appropriate pick-up head, the pulses corresponding to the digits being indicated at 164, line 165 relates to the output of the amplifier and pulse former 156 which provides the shaped pulses 166, the line 167 relates to the output of the integrator, the progressive integration of the pulses 166 being shown at 168, the line 171 relates to the output of the comparator 158, and the line 172 relates to the output of the amplifier 161 which provides a pulse 173 for the output, and the input to the delay circuit 162.

When each pulse 164 is induced in the appropriate one of the windings 152 of the pick-up heads 149 a current passes through the associated winding L1 of the transformer T1 (FIGURE 38) and an amplified voltage pulse appears across the secondary winding L2. The diodes D2 and D3, together with the resistors R106A–R106D, prevent interference between the heads 149 and prevent positive-going pulses appearing in the output winding L2 of the transformer T1.

Each negative pulse from the winding L2 is fed to the control grid of the valve V13 which is connected as a high gain amplifier. The amplified pulse is then limited by the valve V14 which cuts the pulse to a standard amplitude and forms a flat top on it, as shown at 166 in FIGURE 39. The pulses are applied to a Miller integrator valve V15 which integrates the train of pulses as shown at 168. When a predetermined voltage level is reached a pulse is applied to the control grid of the amplifier valve V15. Inversion and further amplification is provided by the valve V17A, the output of which is fed back through a delay network 162 to the valve V15 which resets the integrator to its initial condition. The delay network 162 determines the pulse length and therefore the output from the cathode follower valve V17B is a pulse, the length of which is the characteristic time constant of the delay circuit 162.

The integrator valve V15 may be liable to drift over a long period. An alternative circuit, employing a dekatron counting tube with the output selected from a suitable cathode of the dekatron is shown in FIGURE 40. The circuit of that Figure comprises the pick-up heads 149, an amplifier and pulse former 156, a cold cathode tube coupler 175, a dekatron 176, a thyratron 177 and a reset circuit 178.

The construction shown in FIGURES 41–44 may be substituted for detecting the presence of metal, or metallised, threads embedded within the thickness of banknotes e.g. the threads which are present in Bank of England banknotes. This apparatus comprises four conducting plates 181, 182, 183, and 184 mounted in an insulating body 185 which may for example be substituted for the member 28 in the construction of FIGURES 6–9. The plates 181 and 183 are both connected to conductor 186, the plates 182 and 184 are both connected to a conductor 187. The conductor 186 is connected to an oscillator 188 so that the plates 181 and 183 are excited by a voltage in the frequency range 0–1 megacycle per second. When a metal, or metalised, thread 191 is present in the banknote 5, it provides a capacitive coupling between the plates 181, 183 and the plates 182, 184 so that a pulse is obtained from the conductor 187. Two excited plates 181 and 183 and two receiving plates 182, 184 are provided to allow for the possibility of breaks in the metal or metallised, thread. This construction is employed with the circuit shown in FIGURES 45 and 46. The circuit of FIGURE 45 comprises the sensing head 192 (which has just been described) the oscillator 188, an amplifier 193, a bi-stable circuit 194, a reset pulse amplifier 195, and a magnetic pulse generator 196 as shown in FIGURES 10 and 11. That magnetic pulse generator is mounted on the shaft 23 in this example.

The oscillator 188 is designed to give a pure waveform and to be of high stability. It is of the resistance capacity type and comprises two double triode valves V18 and V19. The valve V18 is connected as a phase-shift amplifier, feedback being taken from across a thermistor TH, which is driven by the maintaining valve V19A. The thermistor TH is biassed to give a stabilised output of about 20 volts. The valve V19B is connected as a cathode follower and forms the output valve of the oscillator.

Each pulse from the plates 182, 184 is amplified by two pentode valves V20 and V21 and is detected by the valve V22A. The pulse is then fed into a cathode follower valve V22B, the output of which is fed to a comparator valve V23A. The valve V23B sets a reference level, the voltage at the junction between the resistors R165, R166 being maintained at a steady value of about 19 volts. A signal of about 14 volts is necessary at the grid of the valve V23A before any signal can appear at its output, and this ensures that any signals reaching that grid which are not due to the presence of a thread in the note 5 do not cause undesired effects.

The magnetic pulse generator 196 provides a reset pulse immediately before the instant at which the pulse from the plates 182, 184 is due to arrive. The magnetic pulse generator 196 is connected to the control grid of the valve V26 which is operated under zero bias conditions. The arrival of the negative-going pulse from the magnetic generator 196 at the control grid of the valve V26 results in a positive pulse of controlled amplitude at the anode of valve V24B. The two valves V24A and V24B are held in their cut off condition with their grids fed capacitively from the outputs of the valves V23B and V27B. The anodes of the valves V24A and V24B are connected to give a current pulse of 0.1 milliamp into the divider resistor chains R172, R173 and R179, R180 of the bi-stable multivibrator valve V25. Thus a pulse from the plates 182, 184 causes the multivibrator V25 to assume one of its two stable states, and a pulse from the magnetic pulse generator 196 causes that multivibrator to change to its other stable state. The output from the valve V25B is differentiated by the capacitor C57 and resistor R181 to provide one positive-going and one negative-going pulse at the output terminal 76 for each thread detected. In the timing diagram (FIGURE 47) the line 197 relates to the output from the plates 182, 184, the pulse due to the presence of a thread in a banknote 5 being indicated at 198, the line 201 relates to the output of the magnetic pulse generator 196, the reset pulse being indicated at 202, the line 203 relates to the multivibrator, its two states being indicated at 204 and 205 respectively, and the line 206 relates to the potential at the output terminal 76, the two output pulses of opposite polarity being indicated at 207 and 208.

The multivibrator is changed from its state 204 to its state 205 at the start of the pulse 198 and consequently any pulses which may be received later in the cycle, until the time of the reset pulse 202, have no effect. This guards against the possibility of counting a note twice if it ever causes two pulses to be generated.

The construction shown in FIGURES 48–50 has both magnetic reading heads 146 for sensing magnetisable numbers on banknotes, and plates 181, 182, 183 and 184 for detecting capacitively the presence of metal or metallised threads in the banknotes. Earthed screens 211 are provided, to prevent interaction between the magnetic and capacitive sensing heads. In this example the screens 211 are of mu-metal 0.005 each thick.

The mechanical contact breaker 17 and 18, the photo electric pulse generator 31, and the magnetic pulse generator of FIGURES 10 and 11, may be inter-changed in the foregoing circuits and may be replaced by any other equivalent device e.g. any other convenient form of pulse generator.

FIGURES 51 and 52 show an electronic counting circuit for use with any one of the circuits of FIGURES 24, 24A, 28, 31, 37, 40 and 45. The circuit of FIGURE 51 comprises an input terminal 212 connected to the appropriate output terminal 76, dekatron counters 213 and 214, a sampling unit 215, a coincidence sampling unit 216, a reset circuit 217, a "correct" counter CM2, an "incorrect" counter CM1, a "correct" relay RL6, an "incorrect" relay RL7, and a switch 103 which is provided in the apparatus as shown in FIGURE 23.

The particular circuits shown are intended for use when counting bundles of banknotes each of which bundles should contain one hundred notes. The closing of the switch contacts 103, when the plate 11 is moved to permit removal of a counted bundle of notes, provides a signal indicating that the counting of that particular bundle is finished. The circuit then provides an output to one or the other of the counters CM2 or CM1, and on one or the other of the relays RL6 or RL7, thereby indicating that the number of notes in the bundle which has been counted is either correct (i.e. 100) or incorrect.

The output pulses from the appropriate output terminals 76 are applied to the input terminal 212 of the circuit of FIGURES 51 and 52 and are thereby applied to the trigger electrode 218 of a cold cathode tetrode valve V28. The valve V29 is a dekatron connected as a counter stage. The valve V29 is a ten cathode dekatron and is used as a selector. Each of its cathodes is provided with a resistive load R199 . . . R208 and it serves to register the unit digit of the number being counted.

The valve V31 is also a dekatron and it is connected similarly to the valve V29 except that it is a twelve cathode dekatron and registers the "tens" count. The outputs from the 0 cathode of the dekatron V29 and the 10 cathode of the dekatron V4 are taken to the input of the coincidence sampling matrix D5, D6, D7.

When the "end of count" switch 103 is closed a pulse is thereby applied to the control grid of the thyratron valve V33 which causes a slow-to-operate relay RL4 in its anode circuit to operate, and also applies a pulse to the coincidence sampling matrix D5, D6, D7 through the capacitor C75 and resistor R252.

The thyratron V32 will fire and operate the relay RL3 only when the coincidence sampling matrix D5, D6, D7 is receiving simultaneously an output from the 0 cathode of the dekatron V29, an output from the 10 cathode of the dekatron V31, and "an end of count" pulse from the thyratron V6.

Under those conditions the relays RL3 and RL4 are caused to operate and thereby cause operation of the "correct" relay RL6 and the "correct" electro-mechanical counter CM2.

In the event of the thyratron V32 failing to file, owing to the counted batch of notes having a number different from one hundred, or having been counted incorrectly, then the relay RL4 is operated by the thyratron V6 and actuates the "incorrect" relay RL7 and the "incorrect" counter CM1.

The dekatrons V29 and V31 are automatically reset at the end of each count by operation of the contacts RL4–1 of the relay RL4, which contacts open when the relay RL4 operates. Those contacts also serve to extinguish the thyratron V33. Manually operable reset contacts 221 are also provided.

Figure 53:
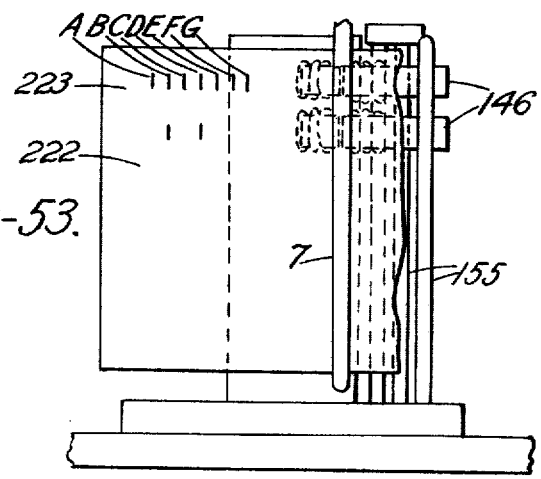
FIGURE 53 shows apparatus for reading from documents data coded in the form of printed magnetisable marks.

The apparatus shown in FIGURE 53 comprises two electro-magnetic reading heads 146 which are similar in construction to those shown in FIGURES 34, 35 and 36, but in this case are positioned to read information carried by a banknote or other document 222 as it passes through the position 5. The banknote 222 has nine marks 223 printed on it in magnetisable ink. The upper row or marks provides seven equally spaced timing marks A . . . G. The lower row consists of two marks in the positions corresponding to B and D. Those two marks B and D may correspond to the number 8, and other numbers may be represented by pairs of marks in any other of the positions opposite to the marks A . . . G, in a so-called "two out of seven" code. As each note passes through the position 5, the upper one of the two electro magnetic reading heads 146 of FIGURE 53 will provide seven pulses, and the lower one of those two heads 146 will provide two pulses.

The outputs from the two heads 146 are taken respectively to the two inputs of an "and" gate circuit. That gate circuit will provide two outputs pulses corresponding to the positions B and D and the output from the gate circuit can be arranged to fire two out of seven thyratrons corresponding to the marks A . . . G. Thus in the case of the note 222 shown in the FIGURE 53 the two thyratrons corresponding to B and D will be fired and that indication can be de-coded to give the number represented in code on the note.

The number of marks in each row may be counted by means of a dekatron tube, and a thyratron may be arranged to fire only when seven marks are present in the upper row (i.e. the timing row) and when two marks are present in the lower row. In that way the operation of the circuit is made proof against reading spurious marks.

Any convenient number of rows of data may be provided, with an appropriate number of reading heads 146. Only one row of timing marks A . . . G need be provided. By providing a larger number of timing marks in that row, rows of marks corresponding to alphabetic data may be interpreted. Codes other than the "two out of seven" code may be employed.

The apparatus shown in FIGURES 54–57 is somewhat similar to that shown in FIGURES 34–36 and is for identifying characters, such as for example the numerals indicated at 224, on a banknote 225. The methods of recognising characters printed in magnetisable ink described in the publication "Automatic Input for Business Data Processing Systems" published by the Stanford Research Institute of Menlo Park, California, U.S.A. may be employed.

The apparatus of this example enables the data to be read at very high speed because the documents do not have to be completely separated from one another in reading the data from them.

Figure 58:
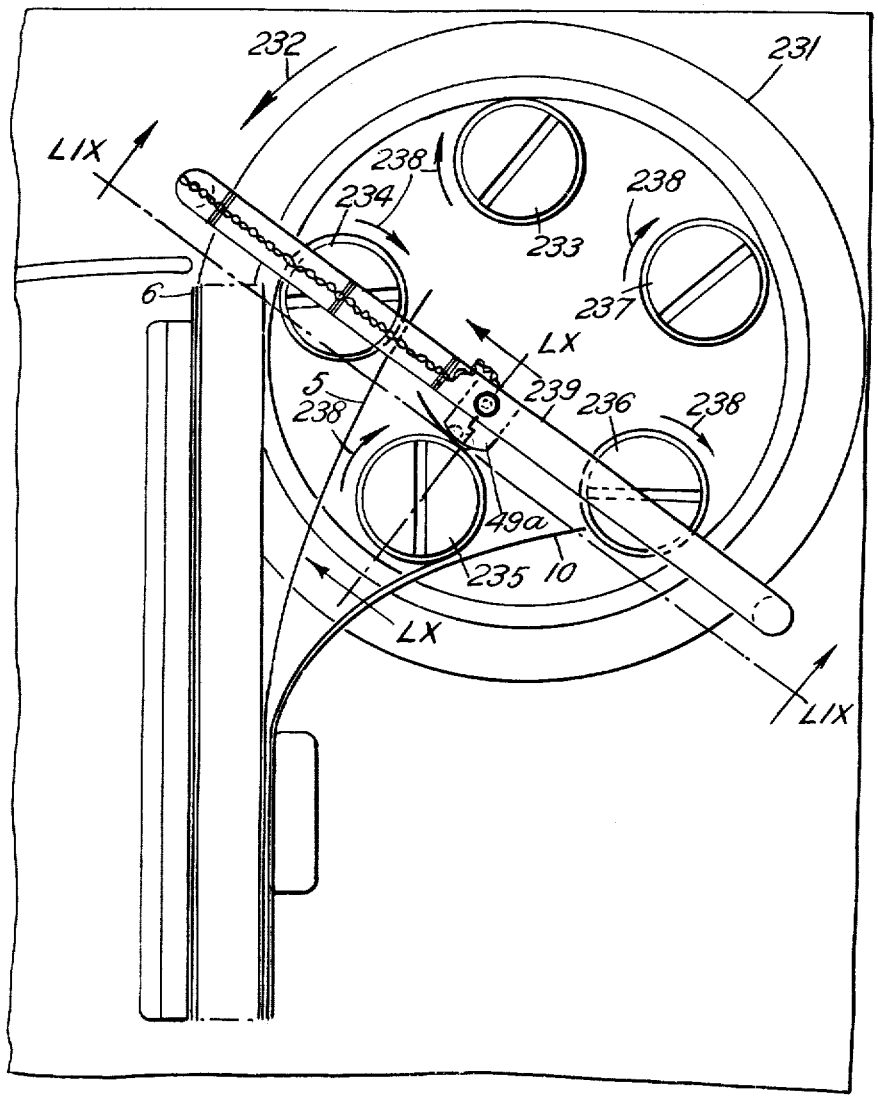
FIGURE 58 shows another construction of apparatus for counting banknotes.

The construction shown in FIGURES 58, 59 and 60 is a modification of that described in British patent specifications Nos. 769,065 and 775,419. It comprises a disc 231 which rotates in the direction indicated by the arrow 232 and carries five sucker heads 233–237. Those sucker heads rotate relative to the disc 231 in the direction indicated by the arrows 238. Each of the sucker heads is connected to a vacuum source and has a suction port at its periphery. Initial separation of a document 5 from the pile 6 is effected by the suction of the sucker head nearest the free end of the pile, i.e. the sucker head 234 in FIGURE 58. The separation of the note, is then increased by the following sucker head which is moved by the disc 232 into the space between the partially separated note 5 and the pile 6.

Pairs of contacts 47a and 48a, similar to the contacts 47 and 48 of the construction of FIGURES 12–16, are supported by an insulating member 49a carried by a rigid bridge 239. In this construction the successive sucker heads 233–237 replace the member 7 of FIGURES 12–16 as the member which co-operates with the contacts 47a and 48a, and the circuits applicable to the construction of FIGURES 12–16 may be employed with this construction.

Each of the sucker heads may be provided with one or more cups formed by a concavely curved face around the periphery of the head and embracing the suction port, as described in British patent specification No. 775,419.

The various components of the electronic circuits shown in FIGURES 25, 29, 32, 38, 46 and 52 have the following values, characteristics or descriptions:

*FIGURE 25*

| | |
|---|---|
| R1 | 390,000 ohms. |
| R2 | 220,000 ohms. |
| R3 | 75,000 ohms. |
| R4 | 27,000 ohms. |
| R5 | 10,000 ohms. |
| R6 | 280,000 ohms. |
| R7 | 10,000 ohms. |
| R8 | 50,000 ohms. |
| R9 | 50,000 ohms. |
| R10 | 500,000 ohms. |
| R11 | 330,000 ohms. |
| R12 | 220,000 ohms. |
| R13 | 10,000 ohms. |
| R14 | 500,000 ohms. |
| R15 | 510,000 ohms±1%, high stability. |
| R16 | 510,000 ohms±1%, high stability. |
| R17 | 2,400 ohms±2%, high stability. |
| R18 | 27,000 ohms±2%, high stability. |
| R19 | 100,000 ohms±1%, high stability. |
| R20 | 2,400 ohms±2%, high stability. |
| R21 | 27,000 ohms±2%, high stability. |
| R22 | 510,000 ohms±1%, high stability. |
| R23 | 510,000 ohms±1%, high stability. |
| R24 | 100,000 ohms. |
| R25 | 390,000 ohms. |
| R26 | 220,000 ohms. |
| R27 | 75,000 ohms. |
| R28 | 10,000 ohms. |
| R29 | 27,000 ohms. |
| R30 | 10,000 ohms. |
| R31 | 50,000 ohms. |
| R32 | 50,000 ohms. |
| R33 | 280,000 ohms. |
| R34 | 290,000 ohms. |
| R35 | 10,000 ohms. |
| C1 | 0.1 microfarad. |
| C2 | 0.1 microfarad. |
| C3 | 0.01 microfarad. |
| C4 | 0.1 microfarad. |
| C5 | 0.1 microfarad. |
| V1 and V4 | valve type EN91. |
| V2 | valve type 12AX7. |
| V3 | valve type 12AT7. |

*FIGURE 29*

| | |
|---|---|
| R36 | 100,000 ohms. |
| R37 | 100,000 ohms. |
| R38 | 100,000 ohms. |
| R39 | 100,000 ohms. |
| R40 | 100,000 ohms. |
| R41 | 100,000 ohms. |
| R42 | 250,000 ohms. |
| R43 | 47,000 ohms. |
| R44 | 47,000 ohms. |
| R45 | 100,000 ohms. |
| R46 | 390,000 ohms. |
| R47 | 510,000 ohms±1%, high stability. |
| R48 | 510,000 ohms±1%, high stability. |
| R49 | 2,400 ohms±2%, high stability. |
| R50 | 2,400 ohms±2%, high stability. |
| R51 | 27,000 ohms±2%, high stability. |
| R52 | 27,000 ohms±2%, high stability. |
| R53 | 100,000 ohms±1%, high stability. |
| R54 | 510,000 ohms±1%, high stability. |
| R55 | 510,000 ohms±1%, high stability. |
| R56 | 470,000 ohms. |
| R57 | 330,000 ohms. |
| R58 | 500,000 ohms. |
| R59 | 47,000 ohms. |
| R60 | 1,500 ohms. |
| R61 | 100,000 ohms. |
| R62 | 22,000 ohms. |
| R63 | 500,000 ohms. |
| R64 | 47,000 ohms. |
| R65 | 120,000 ohms. |
| R66 | 1,500 ohms. |
| R67 | 470,000 ohms. |
| R68 | 1 megohm. |
| C6 | 0.1 microfarad. |
| C7 | 0.1 microfarad. |
| C8 | 25 microfarads, 50 volts working. |
| C9 | 0.01 microfarad. |
| C10 | 0.1 microfarad. |
| C11 | 0.1 microfarad. |
| C12 | 0.1 microfarad. |
| C13 | 25 microfarads, 50 volts working. |
| V4X | valve type 12AT7. |
| V5 and V6 | valve type EF91. |
| D1 | diode. |

*FIGURE 32*

| | |
|---|---|
| R69 | 390,000 ohms. |
| R70 | 390,000 ohms. |
| R71 | 247,000 ohms. |
| R72 | 56,000 ohms. |
| R73 | 330,000 ohms. |
| R74 | 47,000 ohms. |
| R75 | 1,000 ohms. |
| R76 | 56,000 ohms. |
| R77 | 330,000 ohms. |
| R78 | 47,000 ohms. |
| R79 | 1,000 ohms. |
| R80 | 56,000 ohms. |
| R81 | 330,000 ohms. |
| R82 | 1 megohm. |
| R83 | 220,000 ohms. |
| R84 | 10,000 ohms. |
| R85 | 1 megohm. |
| R86 | 510,000 ohms±1%. |
| R87 | 510,000 ohms±1%. |
| R88 | 2,400 ohms±2%. |
| R89 | 27,000 ohms±2%. |
| R90 | 100,000 ohms±1%. |
| R91 | 2,400 ohms±2%. |
| R92 | 27,000 ohms±2%. |
| R93 | 510,000 ohms±1%. |
| R94 | 510,000 ohms±1%. |
| R95 | 330,000 ohms. |
| R96 | 47,000 ohms. |
| R97 | 1,000 ohms. |
| R98 | 56,000 ohms. |
| R99 | 330,000 ohms. |
| R100 | 330,000 ohms. |
| R101 | 47,000 ohms. |
| R102 | 1,000 ohms. |
| R103 | 56,000 ohms. |
| R104 | 270,000 ohms. |
| R105 | 33,000 ohms. |
| C14 | 0.01 microfarad. |
| C15 | 0.10 microfarad. |
| C16 | 0.1 microfarad. |

| C17 | 0.01 microfarad. |
| C18 | 0.1 microfarad. |
| C19 | 0.1 microfarad. |
| C20 | 0.01 microfarad. |
| C21 | 0.01 microfarad. |
| C22 | 0.1 microfarad. |
| C23 | 0.1 microfarad. |
| C24 | 0.1 microfarad. |
| C25 | 0.1 microfarad. |
| C26 | 0.1 microfarad. |
| C27 | 0.1 microfarad. |
| C28 | 0.1 microfarad. |
| V7 | valve type EF91. |
| V8 | valve type EF91. |
| V9 | valve type 12AX7. |
| V10 | valve type 12AT7. |
| V11 | valve type EF91. |
| V12 | valve type EF91. |

FIGURE 38

| R106A, R106B, R106C, R106D | Value chosen to suit pick-up heads. |
| R107 | 1 megohm. |
| R108 | 100,000 ohms. |
| R109 | 1,000 ohms. |
| R110 | 56,000 ohms. |
| R111 | 500,000 ohms. |
| R112 | 180,000 ohms. |
| R113 | 4,700 ohms. |
| R114 | 100,000 ohms. |
| R115 | 220,000 ohms. |
| R116 | 100,000 ohms. |
| R117 | 100,000 ohms. |
| R118 | 1,000 ohms. |
| R119 | 100,000 ohms. |
| R120 | 100,000 ohms. |
| R121 | 47,000 ohms. |
| R122 | 100,000 ohms. |
| R123 | 100,000 ohms. |
| R124 | 270,000 ohms. |
| R125 | 47,000 ohms. |
| R126 | 500,000 ohms. |
| R127 | 100,000 ohms. |
| R128 | 4,700 ohms. |
| R129 | 56,000 ohms. |
| R130 | 500,000 ohms. |
| R131 | 47,000 ohms. |
| R132 | 1,000 ohms. |
| R133 | 22,000 ohms. |
| R134 | 470,000 ohms. |
| C29 | 25 microfarads, 50 volts working. |
| C30 | 0.1 microfarad. |
| C31 | 0.1 microfarad. |
| C32 | 25 microfarads, 50 volts working. |
| C33 | 0.1 microfarad. |
| C34 | 0.1 microfarad. |
| C35 | 0.1 microfarad. |
| C36 | 0.1 microfarad. |
| C37 | 0.1 microfarad. |
| C38 | 0.1 microfarad. |
| C39 | 25 microfarads, 50 volts working. |
| C40 | 0.1 microfarad. |
| C41 | 0.1 microfarad. |
| C42 | 25 microfarads, 50 volts working. |
| V13, V14, V15, V16 | valve type EF91. |
| V17 | valve type 12AT7. |
| D2, D3, D4 | crystal diodes. |

FIGURE 46

| R135 | 240,000 ohms. |
| R136 | 22,000 ohms. |
| R137 | 3,300 ohms. |
| R138 | 3,300 ohms. |
| R139 | 3,300 ohms. |
| R140 | 3,300 ohms. |
| R141 | 8,200 ohms. |
| R142 | 8,200 ohms. |
| R143 | 5,600 ohms. |
| R144 | 1,800 ohms. |
| R145 | 2,200 ohms. |
| R146 | 100 ohms. |
| R147 | 4,700 ohms. |
| R148 | 33,000 ohms. |
| R149 | 220,000 ohms±1%, high stability. |
| R150 | 56,000 ohms±1%, high stability. |
| R151 | 230,000 ohms. |
| R152 | 120,000 ohms. |
| R153 | 100,000 ohms. |
| R154 | 22,000 ohms. |
| R155 | 270 ohms. |
| R156 | 220,000 ohms. |
| R157 | 120,000 ohms. |
| R158 | 22,000 ohms. |
| R159 | 220 ohms. |
| R160 | 180,000 ohms. |
| R161 | 270,000 ohms. |
| R162 | 47,000 ohms. |
| R163 | 27,000 ohms. |
| R164 | 47,000 ohms. |
| R165 | 270,000 ohms±1%, high stability. |
| R166 | 22,000 ohms±1%, high stability. |
| R167 | 330,000 ohms. |
| R168 | 1 megohm. |
| R169 | 220,000 ohms. |
| R170 | 10,000 ohms. |
| R171 | 1 megohm. |
| R172 | 510,000 ohms±1%, high stability. |
| R173 | 510,000 ohms±1%, high stability. |
| R174 | 2,400 ohms±2%, high stability. |
| R175 | 27,000 ohms±2%, high stability. |
| R176 | 100,000 ohms±1%, high stability. |
| R177 | 2,400 ohms±2%, high stability. |
| R178 | 27,000 ohms±2%, high stability. |
| R179 | 510,000 ohms±1%, high stability. |
| R180 | 510,000 ohms±1%, high stability. |
| R181 | 100,000 ohms. |
| R182 | 100,000 ohms. |
| R183 | 270,000 ohms. |
| R184 | 1.8 megohms. |
| R185 | 220,000 ohms. |
| R186 | 27,000 ohms. |
| R187 | 120,000 ohms. |
| R188 | 22,000 ohms. |
| R189 | 15,000 ohms. |
| R190 | 1,000 megohms±1%, high stability. |
| R191 | 220,000 ohms±1%, high stability. |
| C43 | 82 picafarads. |
| C44 | 82 picafarads. |
| C45 | 0.05 microfarad. |
| C46 | 2,000 picafarads. |
| C47 | 0.1 microfarad. |
| C48 | 2,000 picafarads. |
| C49 | 1,000 picafarads. |
| C50 | 220 picafarads. |
| C51 | 1,000 picafarads. |
| C52 | 0.01 microfarad. |
| C53 | 1,000 picafarads. |
| C54 | 0.01 microfarad. |
| C55 | 3,000 picafarads. |
| C56 | 0.25 microfarad. |
| C57 | 0.01 microfarad. |
| C58 | 0.1 microfarad. |

TH thermistor................ Ferranti type 5513/100.
V18, V19, V22, V23, V25, V27.. valves type 12AT7.
V20, V21, V26................ valves type EF91.
V24.......................... valve type 12AX7.

FIGURE 52

R192........ 1 megohm.
R193........ 390,000 ohms.
R194........ 68,000 ohms.
R195........ 10 megohms.
R196........ 220,000 ohms.
R197........ 220,000 ohms.
R198........ 680,000 ohms.
R199........ 150,000 ohms.
R200........ 150,000 ohms.
R201........ 150,000 ohms.
R202........ 150,000 ohms.
R203........ 150,000 ohms.
R204........ 150,000 ohms.
R205........ 150,000 ohms.
R206........ 150,000 ohms.
R207........ 150,000 ohms.
R208........ 150,000 ohms.
R209........ 1 megohm.
R210........ 390,000 ohms.
R211........ 68,000 ohms.
R212........ 10 megohms.
R213........ 220,000 ohms.
R214........ 220,000 ohms.
R215........ 150,000 ohms.
R216........ 150,000 ohms.
R217........ 150,000 ohms.
R218........ 150,000 ohms.
R219........ 150,000 ohms.
R220........ 150,000 ohms.
R221........ 150,000 ohms.
R222........ 150,000 ohms.
R223........ 150,000 ohms.
R224........ 150,000 ohms.
R225........ 150,000 ohms.
R226........ 150,000 ohms.
R227........ 680,000 ohms.
R228........ 220,000 ohms.
R229........ 560,000 ohms.
R230........ 10 megohms.
R231........ 18,000 ohms.
R232........ 10 megohms.
R233........ 150,000 ohms.
R234........ 27,000 ohms, wire wound, 4.5 watt rating.
R235........ 10,000 ohms, wire wound, 4.5 watt rating.
R236........ 15,000 ohms, 1 watt rating.
R237........ 82,000 ohms, 1 watt rating.
R238........ 82,000 ohms, 1 watt rating.
R239........ 68,000 ohms.
R240........ 470,000 ohms.
R241........ 220 ohms.
R242........ 15,000 ohms, 1 watt rating.
R243........ 8,200 ohms, wire wound, 4.5 watt rating.
R244........ 10 megohms.
R245........ 10 megohms.
R246........ 220 ohms.
R247........ 27,000 ohms, wire wound, 4.5 watt rating.
R248........ 10,000 ohms, wire wound, 4.5 watt rating.
R249........ 82,000 ohms, 1 watt rating.
R250........ 82,000 ohms, 1 watt rating.
R251........ 3,300 ohms.
R252........ 470,000 ohms.
C59......... 0.001 microfarad.
C60......... 0.150 picafarad.
C61......... 0.001 microfarad.
C62......... 0.001 microfarad.
C63......... 0.001 microfarad.
C64......... 0.001 microfarad.
C65......... 0.001 microfarad.
C66......... 0.1 microfarad.
C67......... 2 microfarads.
C68......... 8 microfarads.
C69......... 8 microfarads.
C70......... 0.5 microfarad.
C71......... 8 microfarads.
C72......... 8 microfarads, 450 volts working.
C73......... 2 microfarads.
C74......... 0.5 microfarad.
C75......... 2 microfarads.
V28, V30.......... valves type GTE175M (Ericsson).
V29............... dekatron valve GS10C (Ericsson).
V31............... dekatron valve GS12D (Ericsson).
V32, V33.......... valve type EN70.
D5, D6, D7, D10... diodes, S.T.C. Unistors type Q 33.
D8, D9............ diodes, S.T.C. Unistors type Q 35.
B1................ metal rectifier bridge, Brimar type DRM3B.
LP1............... neon lamp 100 volts.
LP2............... lamp 6.3 volts, 0.15 amp. m.e.s.

In FIGURES 25 and 29, the resistors are each carbon resistors with a tolerance of ±20%, ½ watt rating, except where otherwise stated. In FIGURES 32, 38 and 46 the resistors are each carbon resistors with a tolerance of ±10%, ½ watt rating, except where otherwise stated. In FIGURE 52 the resistors are each carbon resistors with a tolerance of ±10%, ¼ watt rating, except where otherwise stated, and all of the wire wound resistors each have a tolerance of ±10%.

All of the capacitors of FIGURES 25, 29, 32, 38, 46 and 52 are rated at 350 volts working, except where otherwise stated. In FIGURE 25 the tolerance on them is ±20%, and in FIGURES 29, 38 and 46 it is ±10%.

The invention is not restricted to the details of the foregoing examples. For instance, the various features of FIGURES 1–57 may be embodied in, or used with, the general type of construction shown in FIGURES 58–60. The sensing means may be adapted to sense the presence of conductive marks on the sheets, e.g. marks printed in conductive ink, or the sensing means may comprise one or more photoelectric pick-ups for sensing fluorescence of fluorescent ink or other material in or on the sheets. The sensing means may comprise contacts arranged to sense punched holes or the like arranged in different rows or columns on the sheets according to a code to represent data. The member 7 may cause the separated sheet to sweep past such stationary sensing devices and the coded data in each sheet may accordingly be read by, for example, determining the position of the mark, hole or other code element in each column, relative to the position of the member 7 along its path 8. Alternatively the sensing devices may be moved with the sheet during its increase in separation e.g. so as to reduce the relative speed of movement between the sensing devices and the sheet.

Particular forms of apparatus with the scope of the invention may, for example, be applied to the following purposes.

To improve the efficiency and extend the range of duties of counting machines for counting worn banknotes and other security documents, more particularly counting machines in which the notes are clamped at one end whilst the other ends or corners are successively separated, e.g. so that a bundle of a hundred notes can be processed by such a machine without removing the banker's band.

To divorce the sensing of a note in a counting machine from a suction separation-initiating system thereof so that porosity, holes and tears will not, or will be less liable to, lead to inaccuracies, because the vacuum can be adjusted for a single purpose and moreover, the accuracy of counting is then unaffected by dirt and the like in the vacuum system.

To make the machine do some primary identification of the documents—e.g. to detect the metal thread in Bank of England notes. Any physical mark imposed in the paper or print and which is capable of automatic detection, could alternatively be employed for this purpose. Alternatively any combination of physical marks, including metal threads, could be detected at the same time.

To provide a means for reading coded information contained in documents, for example reading serial numbers of banknotes. A limitation of present punched card systems is in the speed with which the cards can be mechanically fed through the reading device. That the output of the reading device is now commonly treated electronically, has emphasised the slowness of the feeder. Data-reading apparatus embodying the invention may be constructed to operate quickly because the documents do not have to move bodily. The documents may be bound together in the form of a book.

To test for the presence of threads of material other than metal (e.g. a plastic), or to read information printed on the documents e.g. by use of a magnetic character, recognition system, e.g. by reading characters having visible form printed in magnetisable ink or by identifying magnetisable marks arranged in a positional code. Alternatively, the machine may detect information expressed as variations of the magnetic field density of a film of magnetisable ink or other material. In this case, the information is not visible. When fitted with data reading or detecting devices of this kind the apparatus may be used as a computer input.

We claim:

1. In apparatus for examining a stack of documents held together at one zone and free of each other at portions, the combination of mechanism operating in successive cycles to separate said portions of the documents successively in turn, and including counting mechanism for the documents and document-sensing means responsive, when operative, to a predetermined property of a document to provide a signal; said mechanism including suction-separator means, separation-increasing means, and a control for said document-sensing means; said suction-separator means having a rotatable part for location opposite the free portions of the documents of the stack and for actuation during each cycle of the mechanism to initiate separation of the documents; said separation-increasing means functioning to the extent of increasing separation of the portions by said separator means to enable sensing of the documents by the document-sensing means at a predetermined point in the cycle and being operable orbitally in a path which passes between the initial position of separation of the portions from the stack and the axis of said rotatable part, said path being also around and eccentric with respect to the said axis of said rotatable part; and said control rendering said document-sensing means operative at the predetermined point in the cycle at which the separated portion lies adjacent the document-sensing means.

2. In apparatus for examining a stack of documents the combination according to claim 1, wherein the said eccentric path of the said separation-increasing means is nearest to the said axis of the said rotatable part opposite the said initial position of separation of the portions, and wherein the said document-sensing means comprises a stationary sensing device adjacent the said path within the orbit of said path and on the side of the said rotatable part remote from the said initial position of separation of the portions.

3. In apparatus for examining a stack of documents the combination as claimed in claim 1, wherein the said rotatable part is of decreased radial extent from its axis around that part of its periphery which lies nearest the said initial position of separation of the portions when the separation-increasing means is passing along its said path between the said rotatable part and the said initial position of separation of the portions, thereby to reduce interference between the separation-increasing means and the said portions of the documents in the said initial position of separation.

References Cited in the file of this patent

UNITED STATES PATENTS

| | | |
|---|---|---|
| 2,182,006 | Tauschek | Dec. 5, 1939 |
| 2,275,609 | Bryce | Mar. 10, 1942 |
| 2,413,965 | Goldsmith | Jan. 7, 1947 |
| 2,416,625 | Hooper | Feb. 25, 1947 |
| 2,600,817 | Victoreen | June 17, 1952 |
| 2,810,575 | Holmen | Oct. 22, 1957 |
| 2,911,216 | Richardson | Nov. 3, 1959 |
| 2,926,844 | Devol | Mar. 1, 1960 |
| 2,938,666 | Rand | May 31, 1960 |

UNITED STATES PATENT OFFICE
CERTIFICATE OF CORRECTION

Patent No. 3,093,729                                    June 11, 1963

Peter Ralph Price et al.

It is hereby certified that error appears in the above numbered patent requiring correction and that the said Letters Patent should read as corrected below.

In the grant, lines 3 and 4, and line 13, and in the heading to the printed specification, lines 6 and 7, for "Henry Leveridge Chadder", each occurrence, read -- Henry Loveridge Chadder --; column 1, line 38, for "hte" read -- the --.

Signed and sealed this 25th day of February 1964.

(SEAL)
Attest:
ERNEST W. SWIDER                            EDWIN L. REYNOLDS

Attesting Officer                              Acting Commissioner of Patents